(12) United States Patent
Klemm

(10) Patent No.: US 8,313,566 B2
(45) Date of Patent: Nov. 20, 2012

(54) SYSTEMS AND METHODS FOR PARTICULATE FILTRATION

(75) Inventor: Gerald E. Klemm, Marietta, GA (US)

(73) Assignee: The Southern Company, Atlanta, GA (US)

( * ) Notice: Subject to any disclaimer, the term of this patent is extended or adjusted under 35 U.S.C. 154(b) by 219 days.

(21) Appl. No.: 12/889,820

(22) Filed: Sep. 24, 2010

(65) Prior Publication Data

US 2011/0120311 A1    May 26, 2011

Related U.S. Application Data

(60) Provisional application No. 61/245,935, filed on Sep. 25, 2009.

(51) Int. Cl.
*B01D 45/00* (2006.01)
(52) U.S. Cl. ............ 95/267; 95/272; 55/424; 55/426; 55/428; 55/462
(58) Field of Classification Search ............ 55/424, 55/426, 462, 428; 95/267, 272
See application file for complete search history.

(56) References Cited

U.S. PATENT DOCUMENTS

| | | | | |
|---|---|---|---|---|
| 1,509,911 A * | 9/1924 | Stebbins | | 55/413 |
| 2,700,429 A * | 1/1955 | Wintermute | | 96/71 |
| 2,849,080 A * | 8/1958 | Enright | | 96/416 |
| 2,894,599 A * | 7/1959 | Leininger | | 55/325 |
| 4,721,603 A * | 1/1988 | Krug et al. | | 422/147 |
| 6,048,376 A * | 4/2000 | Miller | | 55/320 |
| 7,828,876 B2 * | 11/2010 | Klemm | | 95/76 |
| 2002/0011052 A1 * | 1/2002 | Oh et al. | | 55/424 |
| 2003/0150198 A1 * | 8/2003 | Illingworth et al. | | 55/406 |
| 2004/0025483 A1 * | 2/2004 | Norman | | 55/444 |

* cited by examiner

*Primary Examiner* — Jason M Greene
*Assistant Examiner* — Dung H Bui
(74) *Attorney, Agent, or Firm* — Dustin B. Weeks, Esq.; Troutman Sanders LLP

(57) ABSTRACT

Devices, systems, and methods improve particulate filtration. A particulate filtration system is implemented within a fossil fuel power plant combustion system. A gas containing particulates flows through the filtration system. The filtration system comprises a collection hopper for collecting the particulates. Within the collection hopper, a particulate trap, upper baffles, and lower baffles are provided to retain collected particulates in the hopper and, thereby, improve the filtration of particulates from the gas flow. The particulate trap can include two sets of variously oriented, interconnecting retaining members crossing the interior of the collection hopper.

23 Claims, 17 Drawing Sheets

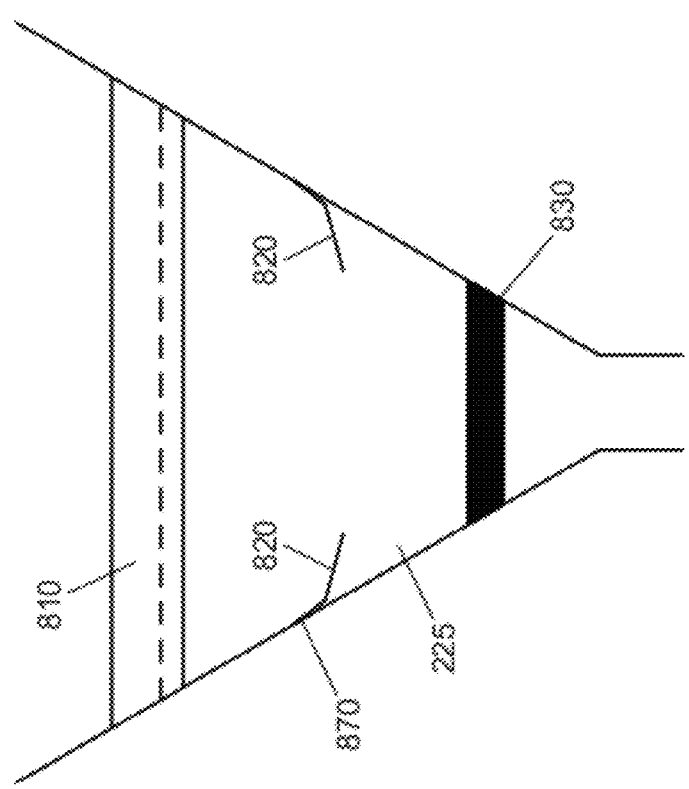
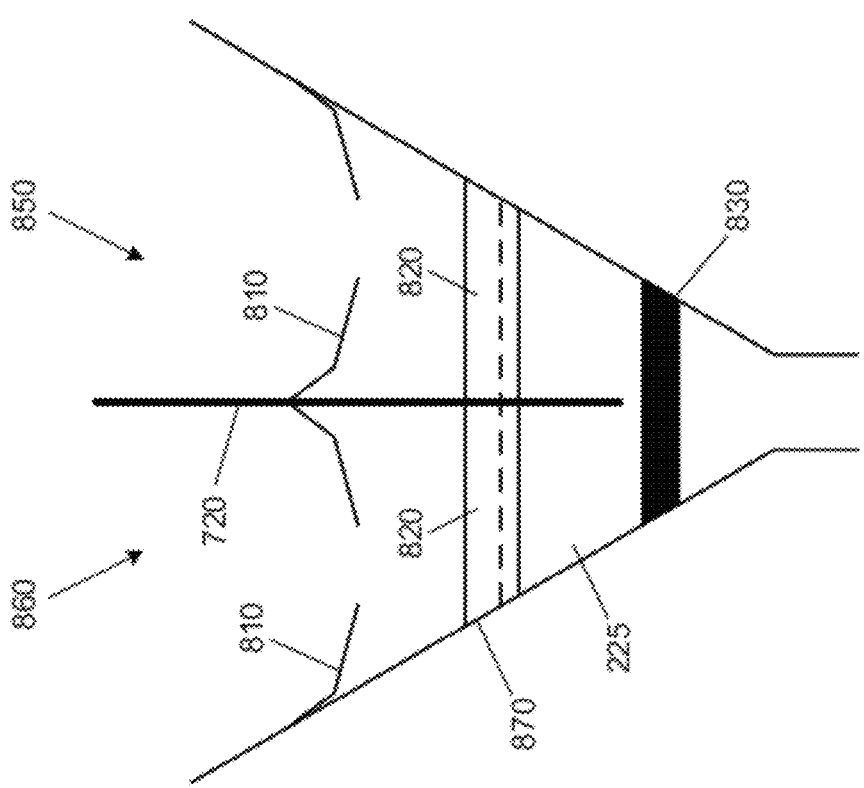
Fig. 8A
Fig. 8B

SYSTEMS AND METHODS FOR PARTICULATE FILTRATION

CROSS-REFERENCE TO RELATED APPLICATION

This application claims the benefit, under 35 U.S.C. §119 (e), of U.S. Provisional Application Ser. No. 61/245,935, filed 25 Sep. 2009, the entire contents and substance of which are hereby incorporated by reference.

BACKGROUND

Embodiments of the present invention relate to fossil fuel power plant emissions and, more particularly, to particulate traps for filtering particulates from the emissions of a fossil fuel power plant.

Fossil fuel power plants are energy conversion centers that combust fossil fuels to produce electricity. A fossil fuel power plant converts the chemical energy stored in fossil fuels such as coal, fuel oil, or natural gas into thermal energy, then mechanical energy, and finally electrical energy for distribution and use. A modern and efficient fossil fuel power plant is capable of cleanly and efficiently converting a large percentage of the chemical energy stored in fossil fuels into electrical energy.

The majority of fossil fuel power plants in the U.S. rely on the combustion of coal. It is an object of the energy conversion process to convert as much chemical energy from coal into electrical energy. Achieving minimal loss in the energy conversion process is crucial to the success of the power plant for many reasons, especially in light of new and more restrictive environmental regulations and the rising costs of fossil fuels.

Clean and efficient power production for coal fired power plants depends in large part on the ability of the system to combust a high percentage of the coal input. The efficiency of coal combustion is measured in terms of Loss on Ignition ("LOI"). LOI refers to the percentage of unburned carbon output from the combustion process. Unburned carbon equates to unburned, wasted fuel, and thus increased operating costs. Therefore, it is a goal of a coal fired power plant to keep the LOI percentage as close to zero as possible. It will be understood by those of skill in the art that a LOI of zero is a theoretical limit, as there will always be some loss due to a number of factors, including furnace design, type of fuel, and operating conditions. For most power plant systems, plant operators strive to achieve a LOI of less than ten percent.

In addition to the desire to minimize LOI, it is important to be able to control the emissions of the coal combustion process, such control is necessary to limit the emission of pollutants, and to meet environmental guidelines and requirements. The coal fired combustion process creates numerous by-products, or off-products, in addition to the primary product of heat. The combustion process produces certain gas and solid emissions. These emissions are primarily contained in a fly ash output of the combustion process. The solid matter emissions are typically solid particulate by-products of coal combustion, which are entrained in the fly ash. The solid particulate is comprised of both inorganic components and organic components. Exemplary inorganic components include silicon dioxide ($SiO_2$), aluminum oxide ($Al_2O_3$) and iron oxide ($Fe_2O_3$). Organic components are primarily carbon derivatives. These carbon derivatives most often take the form of soot and char. Soot and char are unburned fuel residues composed mainly of amorphous carbon.

The conventional means for filtering particulate from the emissions of the coal combustion process is to use electrostatic precipitators. An electrostatic precipitator is a particulate collection device capable of removing particles from flowing gas using the force of an induced electrostatic charge. An electrostatic precipitator has a negative voltage energy field and a positive voltage energy field. In practice, the flowing gas passes first through the negative voltage energy field, thus negatively charging. Then the flowing gas passes through the positive voltage energy field, and thus the negatively charged solid particulate matter is attracted to, and collected on, a positively charged collecting plate. To be effective, the solid particulate must be capable of accepting the negative charge and maintaining that charge for a sufficient time while migrating from the negatively charged field to the positively charged field.

In many instances, the solid particulate has an electrical resistivity between the range of approximately $10 \times 10^5$ to $10 \times 10^{11}$ ohm-centimeters (ohm-cm) to effectively collect and dissipate the charge. Particulate with too low a resistive value may charge very quickly, but then discharge as soon as it exits the negative voltage energy field. Thus, such particulate may not be attracted to the positively charged collection plate by the time the particulate migrates to an area proximate the plate. Particulate with too high a resistive value may charge very slowly or essentially not charge, and thus not be attracted to the collection plate when flowing in the area proximate the plate. Thus, if the fly ash contains particulate of an improper electrical resistivity, then a large percentage of that particulate may not be filtered from the fly ash by the electrostatic precipitator and may potentially be permitted to exit the system as undesirable emissions.

Conventional electrostatic precipitators are effective and efficient at filtering the particulate that exhibits an electrical resistivity in the appropriate range, such as the inorganic components of the fly ash particulate. Conventional electrostatic precipitators, however, are relatively ineffective in filtering the organic components of the fly ash particulate. The organic components are comprised primarily of carbon, which is an electrical conductor, and thus, the organic components do not exhibit the necessary electrical resistivity to be effectively filtered by the electrostatic precipitator.

The problem of unfiltered particulate is exacerbated when the LOI levels of a combustion system increase. The conductive carbon can lower the resistivity levels of combined particulate matter, and thus the percentage of unfiltered particulates in general can increase. Increased particulate emissions can be detrimental to the power plant and can possibly exceed the allowable emissions limits. Power plants that exceed regulatory emission levels can be subject to fines, restrictions, and other detrimental measures.

For many reasons, it is highly undesired to emit organic particulate containing carbon from the stacks of the coal fired power plant. Not only are certain levels of carbon emission pollutants in violation of environmental regulations, they are also highly visible emissions. Carbon particulate emissions have a high opacity and, therefore, create an objectionable stack appearance. Carbon particulate emissions are primarily dark particles and are high in surface area, making these particles more visible in the atmosphere. Thus, the opacity of carbon emissions can detrimentally affect both the environment and the public's perception of the power plant. In addition to meeting environmental regulations, power plant operators desire to remain in good standing with their surrounding community, and thus strive to limit opaque emissions from plant stacks.

The ineffectiveness of the conventional filtration methods in removing organic particulate is increasingly problematic in light of recent changes to the operation of many coal fired power plants. The Clean Air Act Revision of 1990, 42 U.S.C. §7401 et seq., provides tight restrictions on nitrous oxide emissions. In order to meet these restrictions, many power plants have implemented modifications to their processes to delay the emission point of the combustion system and extend the burnout period of the ignited fuel in the furnace. A goal of these modifications is to extract a maximum same amount of thermal energy from the coal fuel, but to do so at lower flame temperatures to minimize the creation of excess nitrogen oxide. These modifications have been successful at lowering the nitrous oxide emissions of many plants, but, at the same time, these modifications have resulted in an increase in LOI. More specifically, the changes to reduce nitrous oxide have increased the levels of unburned carbon fuel released from the combustion system. As organic particulate is often primarily comprised of carbon, it is thus increasingly important to enable efficient and effective filtration of organic particulate.

In the late 1990s and early 2000s, certain power plants were experiencing high LOI as a result of compliance technology for nitrous oxide reduction, which technology is often referred to as Lonox. Lonox burners resulted in high carbon production. More recently, the industry seeks to reduce mercury emissions. Just as carbon is effective at absorbing radical metals such as mercury, carbon is also effective at reducing mercury emissions. Therefore, carbon is now being introduced into the system to reduce mercury emissions. When carbon is trapped by the filtration system, other particles, such as mercury, absorbed by or otherwise associated with the carbon, can be trapped and desirably filtered along with the carbon. Accordingly, the need to reduce carbon emissions becomes even more imperative.

SUMMARY

Briefly described, various aspects of the present invention provide systems and methods for particulate filtration. In an exemplary embodiment, an organic particulate filtration system is implemented within a fossil fuel power plant combustion system. The filtration system comprises one or more collection containers, or hoppers, located proximate a precipitator collection area. Within at least one of the containers, various retaining members can be provided to reduce the amount of media, such as organic particulate, that would otherwise escape from the container. The retaining members can include one or more upper baffles, one or more lower baffles, and a particulate trap.

The upper and lower baffles can be provided in generally symmetrical pairs, and pairs of upper baffles can be located higher in the container than pairs of the lower baffles. The baffles can be oriented in a generally downward and inward-angled orientation. Each baffle can have first and second sections. The first section can extend along the side wall of the container. The second section can extend both downward and into the interior of the container, such that the second sections of a symmetrical pair of baffles extend generally downward and toward each other. The second section of the baffles can be adapted to reduce the amount of media that would otherwise exit the container.

The particulate trap can be positioned in the container below the particulate baffles. The trap can be shaped to fit securely into the container. For example, the container can have four internal faces, and similarly, the trap can have four sides corresponding to the internal faces of the container. In some embodiments, the trap can be divided into sections, for example, four trapping sections. The trapping sections can be separated from one another by a center divider and two side dividers. The center divider can extend from the center of one side of the trap to the center of the opposite side of the trap. Each side divider can extend approximately perpendicularly from the center divider to a side of the particulate trap.

The particulate trap can comprise trapping or retaining members, such as slats, extending across the particulate trap, or across one or more trapping sections of the particulate trap. In an exemplary embodiment, the particulate trap or each individual trapping section can contain two sets of slats, each set comprising slats that are substantially parallel to each other. Within each set, the slats can be oriented at different angles with respect to the sides of the particulate trap, even though positioned substantially parallel to one another in a longitudinal direction. The two sets can extend longitudinally across the particulate trap, or across a trapping section, in substantially perpendicular directions. The two sets of slats can be interconnected, wherein at least one slat of the first set intersects or otherwise contacts at least one slat of the second set. Accordingly, the particulate trap can include an arrangement of variously angled sections and slats to impede the escape of media from a container of the filtration system.

These and other objects, features, and advantages of the present invention will become more apparent upon reading the following specification in conjunction with the accompanying drawing figures.

BRIEF DESCRIPTION OF THE DRAWINGS

FIG. 8A illustrates a cross-sectional, side view of a collection hopper of a filtration system, according to an exemplary embodiment of the present invention.

FIG. 8B illustrates a second cross-sectional, side view of the collection hopper of the filtration system, approximately perpendicular to the view of FIG. 8A, according to an exemplary embodiment of the present invention.

DETAILED DESCRIPTION

Figure 1:
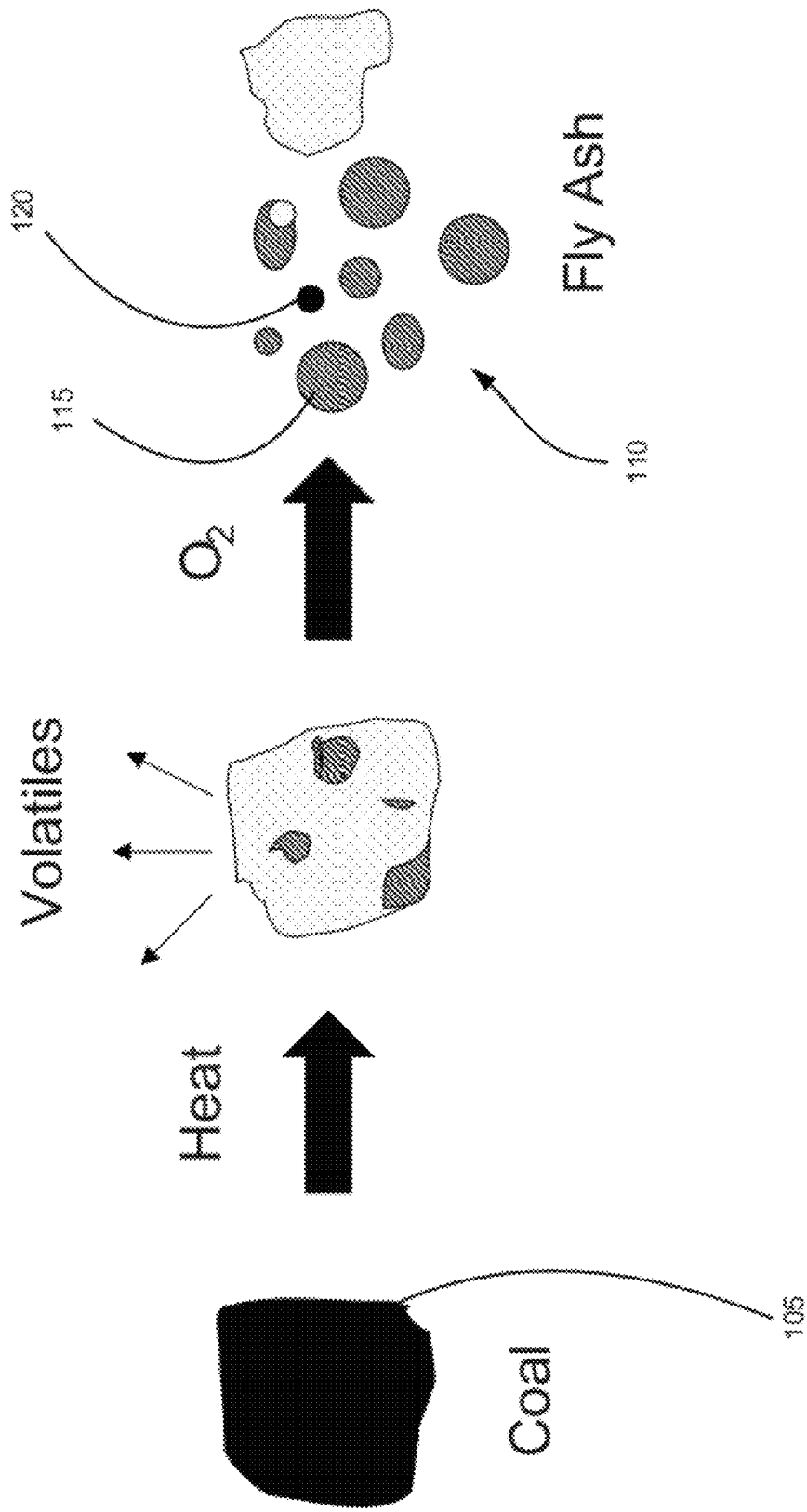
FIG. 1 illustrates various stages coal and its by-products go through in a coal fired power plant combustion system.

To facilitate an understanding of the principles and features of the invention, it is explained hereinafter with reference to its implementation in illustrative embodiments. In particular, the invention is described in the context of being a particulate filtration system for a power plant. Embodiments of the invention, however, need not be implemented in a power plant but can be used whenever a combustion process can generate residual organic components. For example and not limitation, embodiments of the invention can be used in, or in conjunction with, heavy oil fire utility boilers that burn crude oil, or biomass units that burn pulp wood or bark.

The components described hereinafter as making up various elements of the invention are intended to be illustrative and not restrictive. Many suitable components that would perform the same or a similar function as the components described herein are intended to be embraced within the scope of the invention. Such other components not described herein can include, but are not limited to, for example, components that are developed after development of the invention.

Referring now to the figures, wherein like reference numerals represent like parts throughout the figures, systems and methods for particulate filtration will be described in detail.

FIG. 1 depicts various states of coal and coal by-products in a power plant combustion system. Initially, coal 105 is introduced to the system. The coal 105 can be processed into fine coal particles to enhance combustion of the coal 105 and promote more complete burning of the coal 105. After the coal is introduced into the combustion chamber, chemical energy of the coal 105 is released as heat. Additionally, by-products of the coal combustion are released from the chamber in fly ash 110. These by-products in the fly ash 110 can include both inorganic particulate 115 and organic particulate 120. Exemplary inorganic particulate 115 can include silicon dioxide ($SiO_2$), aluminum oxide ($Al_2O_3$), and iron oxide ($Fe_2O_3$). Exemplary organic particulate 120 can include carbon derivatives, such as soot and char, which are unburned fuel residues composed mainly of amorphous carbon.

Figure 2:
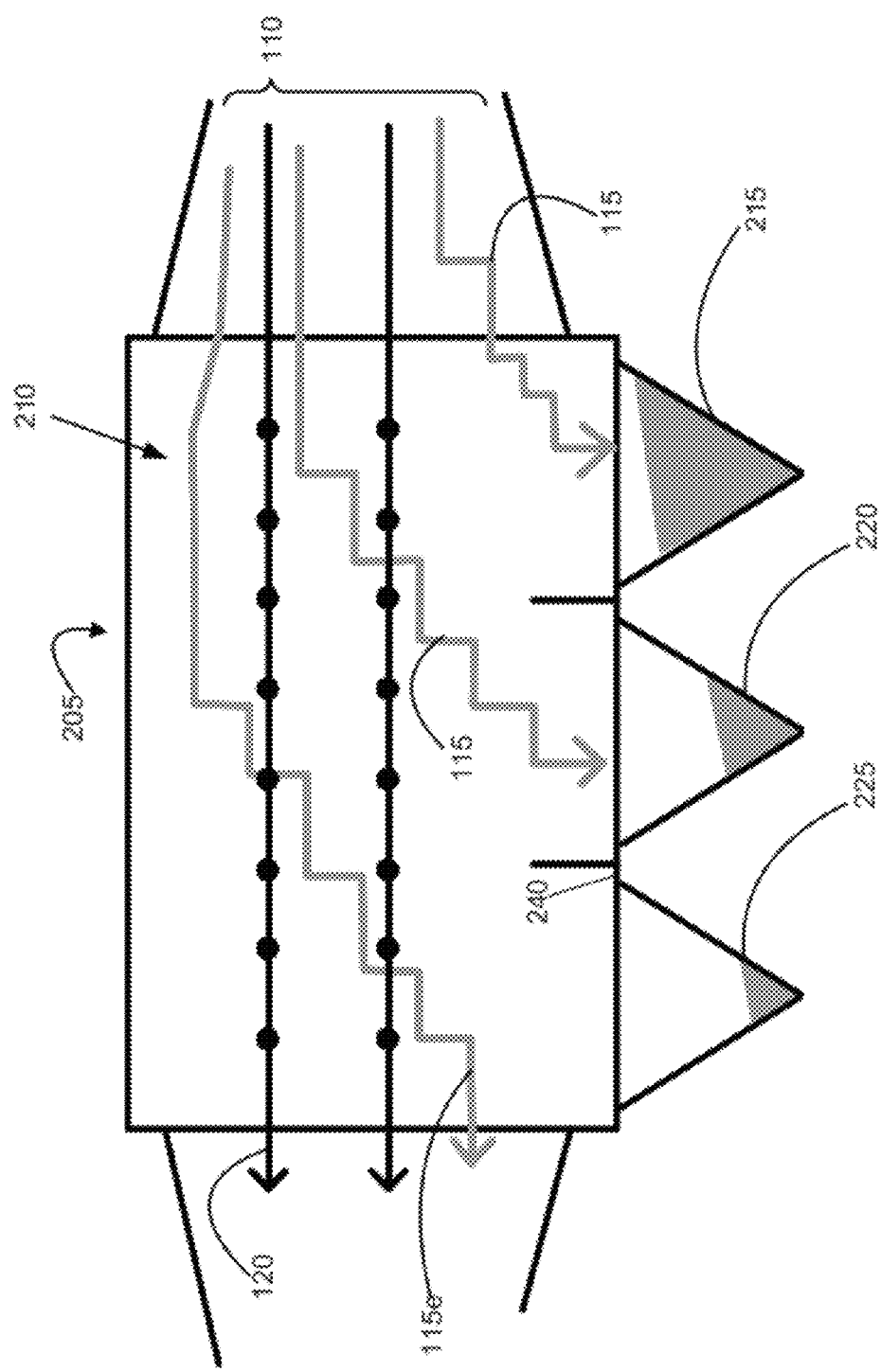
FIG. 2 illustrates an estimate of the flow pathway in the prior art for the entrained particulate of fly ash in a filtration system of the coal fired power plant combustion system.

Upon discharge from the combustion chamber, the fly ash 110 containing both inorganic particulate 115 and organic particulate 120 can be processed by a filtration system 205 (see FIG. 2). One exemplary purpose of the filtration system 205 is to filter out the particulates 115 and 120, and thus limit or prevent emission of the particulates 115 and 120 by the coal fired power plant.

FIG. 2 illustrates an estimate of a flow pathway (e.g., from right to left) of particulates 115 and 120 entrained in the fly ash 110, as the particulate 115 and 120 flows through the filtration system 205. Conventional filtration systems are known in the art, and can suffice to serve as bases for exemplary embodiments of the present invention. In some embodiments, as in conventional systems, the filtration system 205 can include a collection mechanism for collecting particulate matter into containers. The collection mechanism can comprise an electrostatic precipitator 210, collection plate 305 (see FIG. 3), and collection containers 215, 220, and 225.

The electrostatic precipitator 210 can filter particulates by biasing the particulates 115 and 120 entrained in a gas with a charge, thereby enabling collection of the particulates 115 and 120 in an energy field biased with an opposing charge. For example, entrained particulates 115 and 120 flowing through the electrostatic precipitator 210 can be negatively charged by the precipitator 210, and then collected on a positively charged collection plate 305, or other collection surface or collection apparatus. Alternatively, although less conventionally, entrained particulates 115 can be positively charged by the precipitator 210, and then collected on a negatively charged collection plate 305. The particulates 115 and 120 can accumulate on the collection plate 305 into a dust cake 310, or cohesive cake, which can remain on the collection plate 305 until a physical force is applied to the plate 305 to release or remove the dust cake 310.

Figure 3:
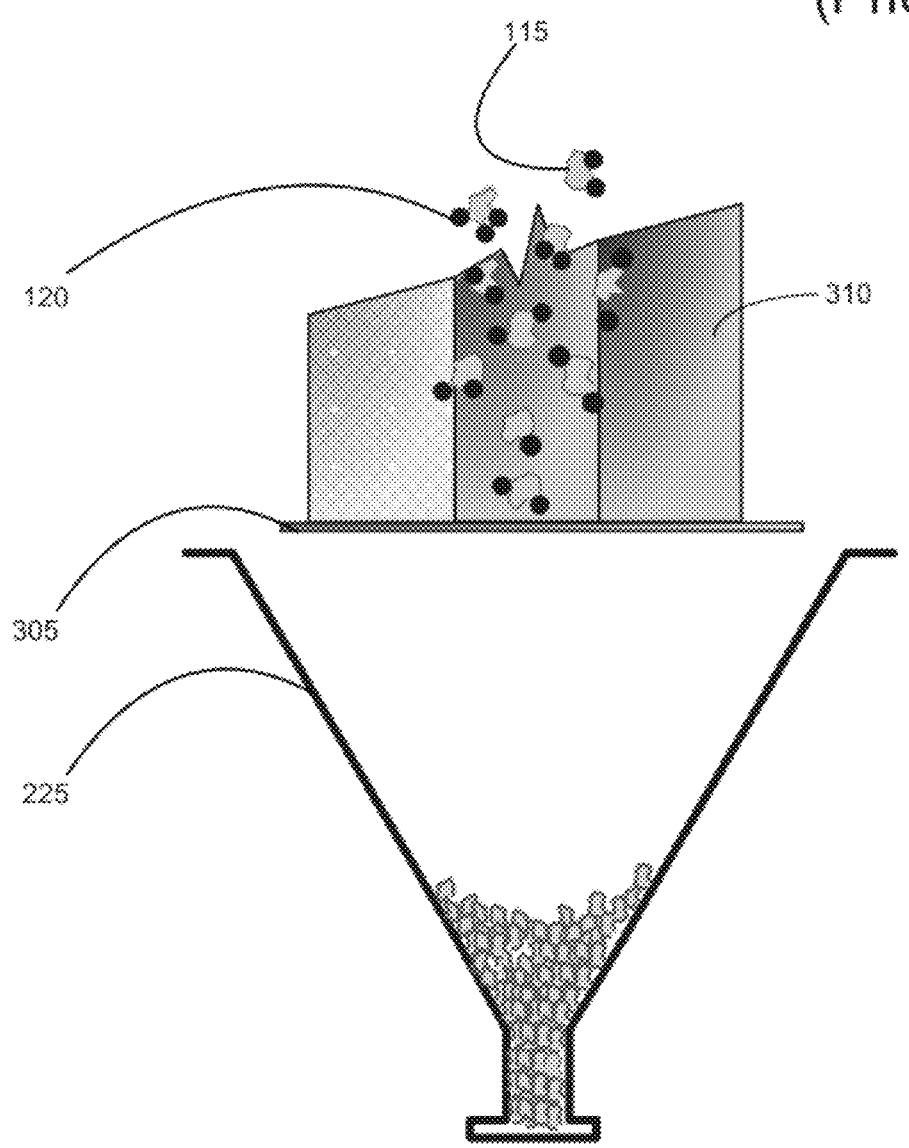
FIG. 3 illustrates the behavior of particulates in the conventional filtration system.

FIG. 3 illustrates accumulation of particulates 115 and 120 into a dust cake 310 on the collection plate 305. It is beneficial to remove the dust cake matter from the collection plate 305 in a manner that does not induce separation or degradation of the dust cake 310. If the dust cake 310 is excessively vibrated or shaken, it will break into pieces, causing particulates 115 and 120 can be re-entrained in the flowing gas of the filtration system 205. In an exemplary embodiment, the dust cake 310 can be released by rapping the collection plate 305. Upon release from the collection plate 305, the dust cake 310 can fall into one of the collection containers 215, 220, and 225, which can be hoppers, located beneath the electrostatic precipitator 210. At least one hopper 215, 220, and 225 is provided, but the filtration system 205 can implement a plurality of collection hoppers 215, 220, and 225. In some embodiments, at least one collection plate 305 can be provided per collection hopper 215, 220, and 225. The particulates 115 and 120 filtered by the electrostatic precipitator 210 can ultimately descend into the hoppers 215, 220, and 225, which can be positioned generally beneath the collection plates 305 of the electrostatic precipitator 210. Various other arrangements of hoppers 215, 220, and 225 and collection plates 305 can be provided without departing from the scope of this invention.

The inorganic particulate 115 is understood to migrate through the electrostatic precipitator 210 in essentially a descending pathway. A significant portion of the inorganic particulate 115 can collect on the collection plate 305 and descend into the first collection hopper 215. A portion of the remainder of the inorganic particulate 115 can descend at a slower pace in the flow pathway and can be collected in the second collection hopper 220. Further still, a portion of the remainder of the inorganic particulate 115 can descend at an even slower rate in the flow pathway and can be collected in the third collection hopper 225. The inorganic particulate 115 that remains entrained in the gas flow can exit the filtration system 205.

Conventional filtration systems have utilized various techniques in attempts to efficiently and effectively filter inorganic particulate 115 and organic particulate 120 from the fly ash 110. One method conventionally used is referred to as skewed flow. Skewed flow attempts to improve performance of the electrostatic precipitators in the filtration system 205 by altering the direction of the gas flow in either an ascending manner or a descending manner. The resulting "skewed" flow increases the time of exposure of both the inorganic particulate 115 and the organic particulate 120 to the electrostatic precipitator 210. Additionally, the skewed flow methodologies attempt to decrease the velocity of the flue gas in lower portions of the filtration system 205. While this methodology can improve filtration with respect to inorganic particulate 115, it is generally ineffective with respect to organic particulate 120.

As discussed above, traditional methods of particulate filtration have proven unsuccessful at adequately reducing carbon emissions. This lack of success has previously been thought to result from the failure of organic particulate 120 to collect on the collection plate of the electrostatic precipitator 210 and the failure to make it into the collection hoppers. Conventionally, it was assumed that the majority of the organic particulate 120 migrated through the electrostatic precipitator 210 in essentially a horizontal path, as depicted of the organic particulate 120 in FIG. 2. It was also assumed that the conductive nature of the organic particulate 120 prevented it from retaining a charge, and thus being collected by the electrostatic precipitator 210. Additionally, it was assumed that the lightweight nature of the organic particulate 120 impeded its decent into the collection hoppers 215, 220, and 230 by gravity. Thus, as depicted in FIG. 2, the lightweight and conductive organic particulate 120 was believed to essentially flow straight through the electrostatic precipitator 210.

Close observation and analysis of the behavior of the particulates 115 and 120 during the filtration process illustrates that the previous assumptions with respect to the flow pathway of the organic particulate 120 in the filtration system 205 are incorrect. Studies have illustrated that indeed a large percentage of the organic particulate 120 in the fly ash 110 is collected in the dust cake 310 that builds up upon the collection plates 305 of the electrostatic precipitator 210.

FIG. 3 is an illustration of the true behavior of some particulates 115 and 120 in the filtration system 205. As shown, the entrained particulate can collect into a dust cake 310 on the collection plate 305 of the electrostatic precipitator 210. The dust cake 310 contains both organic particulate 120 and inorganic particulate 115, due to agglomeration of the particulates 115 and 120. Agglomeration can occur when particles join together either by electrical or physical means. As shown, the organic particulate 120 does not simply migrate in a lateral fashion through the electrostatic precipitator 210 grid, as depicted in FIG. 2, but an amount can collect on the collection plate 305 as depicted in FIG. 3.

After collection on the collection plate 305, the organic particulate 120 and inorganic particulate 115 agglomeration in the dust cake can descend into the collection hopper 215, 220, and 225. The particulates 115 and 120 that are successfully collected in the collection hopper 215, 220, and 225 can be extracted from the filtration system 205 and thus prevented from contributing to the emissions of the combustion system. Trapped particulates 115 and 120 can be evacuated by a vacuuming system. Alternatively, the trapped particulates 115 and 120 can be flushed by gravity or by a water system out of the collection hopper 215, 220, and 225, or can be evacuated from the hopper 215, 220, and 225 by other means. Conventional means, however, have been unsuccessful in effectively extracting this collected organic particulate 120 from the filtration system 205 even after the organic particulate has been initially collected, as in FIG. 3.

Figure 4:
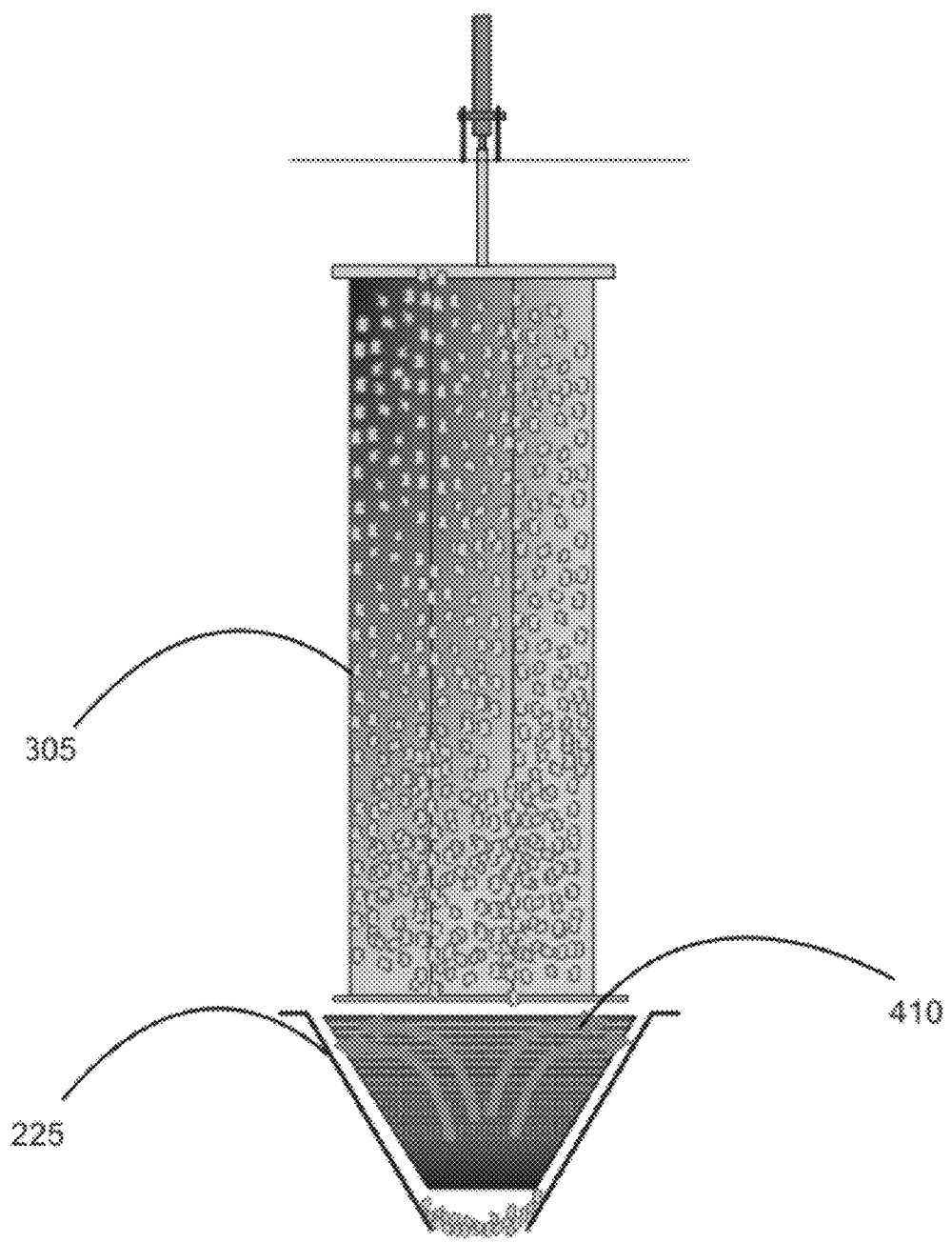
FIG. 4 illustrates the migration of dust cake matter into a collection hopper, as conventionally understood.

FIG. 4 is an illustration of migration of the dust cake 310 matter into the collection hopper 215, 220, and 225. As shown in FIG. 4, the collection hopper 215, 220, and 225 is located generally beneath the collection plate 305, such that when a releasing physical force is applied to the collection plate 305, the dust cake 310 matter can be permitted to descend into the collection hopper 215, 220, and 225. When the organic particulate 120 and the inorganic particulate 115 contained in the dust cake 310 matter fall into the collection hopper 225, the solid matter of the dust cake 310 inserted into the collection hopper 225 displaces an equivalent volume of gas 410 contained in the collection hopper 225. The displaced gas 410 exiting the collection hopper 225 is reintroduced into the filtration system 205, and may ultimately exit the filtration system 205.

Figure 5:
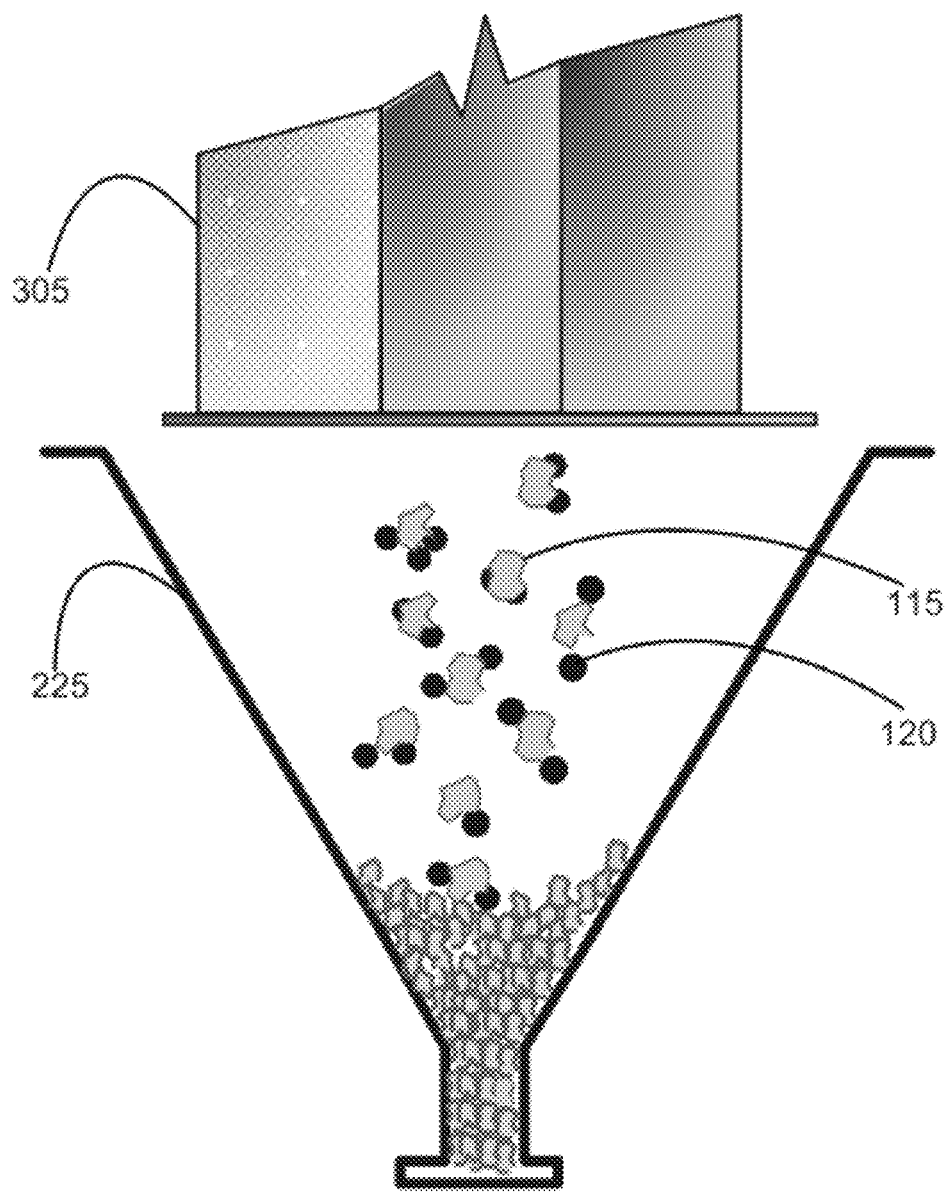
FIG. 5 illustrates a more detailed view of the migration of the dust cake matter into the collection hopper, as conventionally understood.

FIG. 5 is a further illustration of the migration of the dust cake 310 matter into the collection hopper 215, 220, and 225. As illustrated in FIG. 5, the dust cake matter that falls from the collection plate 305 into the collection hopper 215, 220, and 225 is an agglomerated combination of both inorganic particulate 115 and organic particulate 120. The dust cake 310, however, can break apart upon its descent into the collection hopper 225. Portions of the lighter organic particulate 120 can separate from portions of the heavier inorganic particulate 115. The inorganic particulate 115 can continue descend to the bottom of the collection hopper 225, while much of the organic particulate 120 can be re-entrained in the gas 410 contained in the collection hopper 215, 220, and 225. The organic particulate 120 can then be re-entrained in the displaced gas 410 and forced out of the collection hopper 215, 220, and 225 as a result of insertion of the dust cake 310 into the hopper 215, 220, and 225. The re-entrained organic particulate 120 can then be permitted to exit the filtration system 205, and is thereby emitted from the combustion system.

Figure 6:
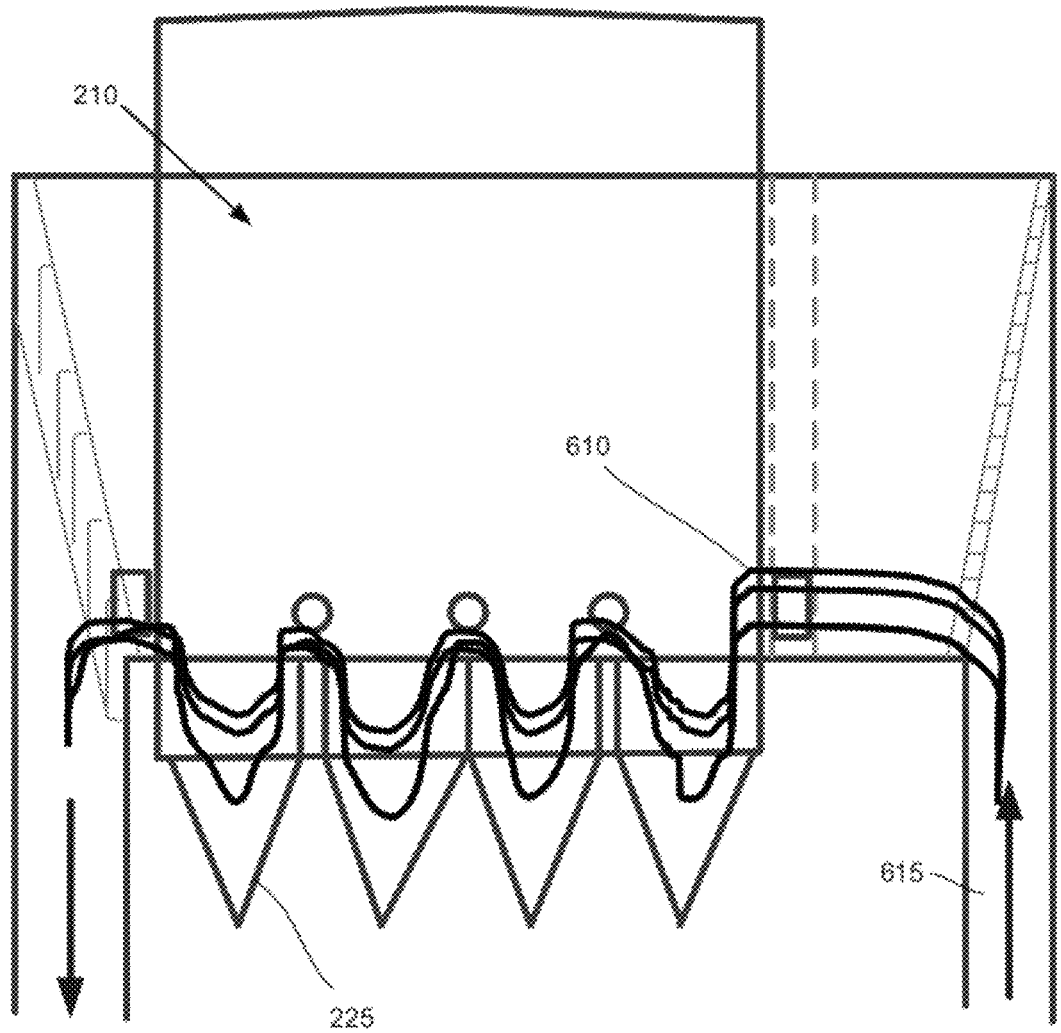
FIG. 6 illustrates an exemplary gas flow pathway through the conventional filtration system.

FIG. 6 illustrates gas flow 610 through the filtration system 205 without the use of baffles. More specifically, FIG. 6 illustrates an elevation cross-section of a typical precipitator 210. Gas 610 flows upward from an inlet duct 615, over the hoppers 215, 220, and 225, and then downward and out. Gas flows in and out of the hoppers 215, 220, and 225, and as the gas 610 flows, it can sweep particulates 115 and 120 out of the hoppers 215, 220, and 225. This flow of gas 610 through the hoppers 215, 220, and 225 can disturb the collected particulate, thereby further allowing the organic particulate 120 to be re-entrained in the gas 410 and 610. In conventional systems, conventional baffles are used to avoid this occurrence.

Figure 7:
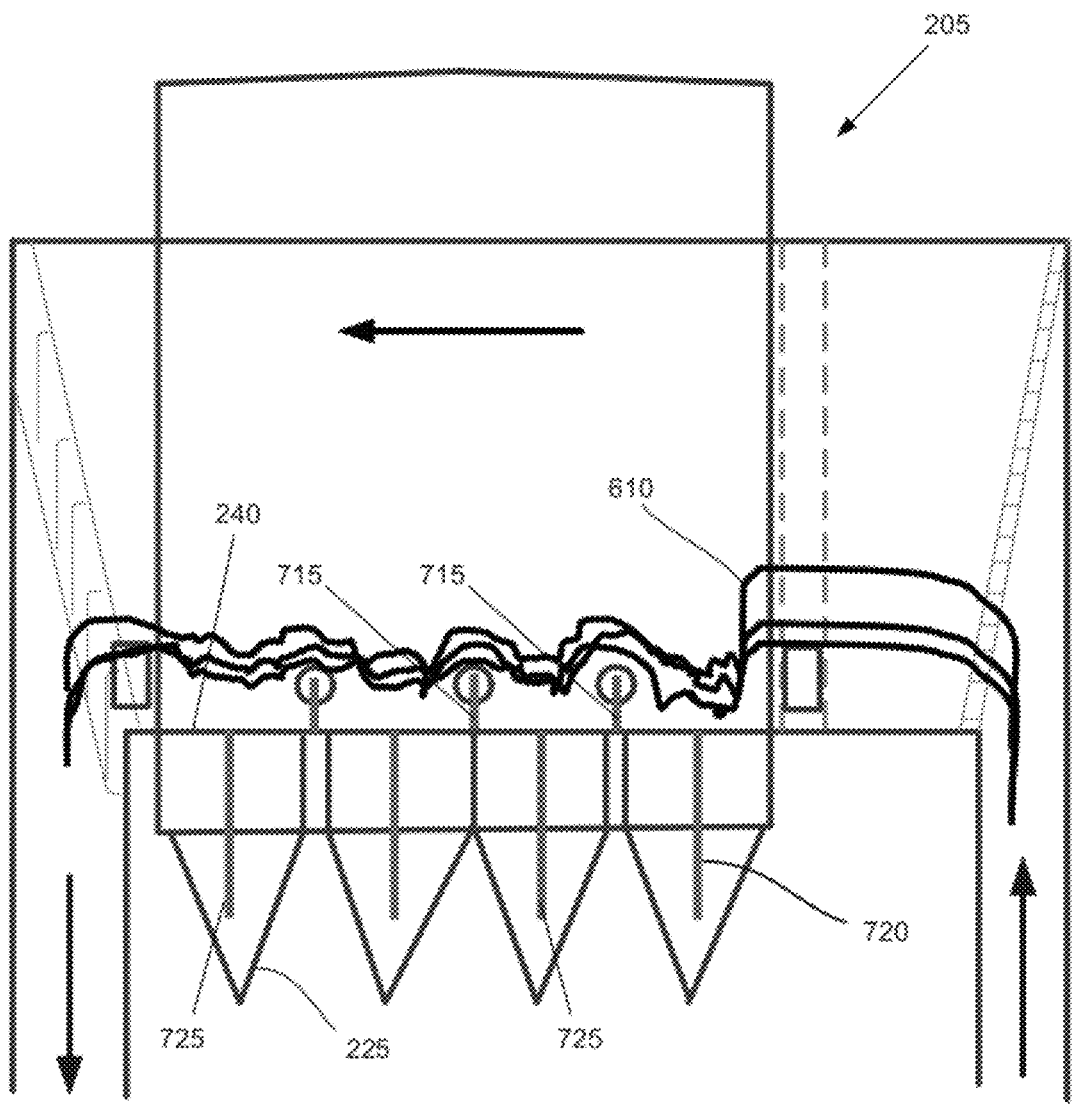
FIG. 7 illustrates an exemplary gas flow pathway through the conventional filtration system with use of walkway baffles and hopper baffles.

FIG. 7 illustrates gas flow 610 through the filtration system 205 when conventional baffles, walkway baffles 715 and hopper baffles 720, are used. Walkway baffles 715 and hopper baffles 720 limit gas flow 610 through the filtration system 205. Through use of these baffles 715 and 720, gas flow 610 through the hoppers 215, 220, and 225 is limited, thereby reducing the disturbance of the dust cakes 310 and ash collected in the hoppers 215, 220, and 225.

Walkway baffles 715 can be positioned between each of the collection hoppers 215, 220, and 225, and oriented approximately perpendicular to the walkway 240, or floor, of the filtration system 205. The walkway baffles 715 illustrated and described herein are an exemplary embodiment and can be implemented in a variety of alternate manners. For example, the walkway baffles 715 can be placed at various other locations in the filtration system 205 and can embody various orientations beyond normal to the floor of the system 205. Further, various quantities of walkway baffles can be implemented in the filtration system 205.

The walkway baffles 715 can limit the crosswise flow of gas in the lower regions of the filtration system 205. The walkway baffles 715 also assist to limit disturbance of the dust cakes 310 in or above the collection hoppers 215, 220, and 225. As with the skewed flow methodologies, walkway baffles can improve filtration with respect to inorganic particulate 115, but are generally ineffective against organic particulate 120. Thus, none of the conventional filtration methodologies are effective with respect to limiting the amount of organic particulate 120 exiting the system 205.

Walkway baffles 715 hang above and between the hoppers, and are oriented approximately normal to the walkway 240 of the filtration system 205. Generally, a walkway baffle is positioned entirely outside of the hoppers 215, 220, and 225. In some conventional systems, however, one end of the walkway baffle can extend into a hopper 215, 220, and 225, while the other end remains outside of the hopper 215, 220, and 225. The walkway baffles 715 can be static or dynamic. If static, the baffles 715 can stay rigidly in place, resisting allowance of gas flow 610. If dynamic, the walkway baffles 715 can swing, thereby encouraging movement throughout the filtration system 205 though still limiting gas flow 610. Hence, through use of dynamic walkway baffles 715, gas flow 610 is limited along the walkways, but is still permitted to some degree. The swing baffles 715 allow gas 610 to flow through the baffles 715, thereby encouraging continuous movement throughout the system 205 and allowing particulates 115 and 120 to be trapped in succeeding hoppers 220 and 225.

The filtration system 205 can also comprise hopper baffles 720, which, like walkway baffles 715, are oriented approximately normal to the walkway 240. Each hopper baffle 720 can extend from outside and above a hopper 215, 220, and 225 to within the hopper 215, 220, and 225. Accordingly, one end of a hopper baffle 720 is positioned outside of the hopper 215, 220, and 225, while the other end of the hopper baffle is positioned inside the hopper 215, 220, and 225. Optionally, a hopper baffle 720 can be dynamic or can comprise a dynamic portion toward its lower end. Like the walkway baffles 715, the hopper baffles 720 limit gas flow 610 proximate the hoppers 215, 220, and 225, thereby limiting disturbance of collected particulates 115 and 120.

Organic particulate 120 can be up to six times lighter than inorganic particulate 115. Therefore, less flow velocity is required to stir up the organic particulate 120, causing it to rise out of the hopper 225 and be re-entrained in the gas flow 610. Organic particulate 120 is more difficult to capture than heavier, inorganic materials, and may be more important to capture than inorganic particulate 115. Therefore, embodiments of the present filtration system 205 provide additional means for trapping organic particulate 120 within the filtration system 205.

FIGS. 8A-8B illustrate an exemplary arrangement of retaining members in a hopper 215, 220, and 225, according to an exemplary embodiment of the present invention. FIG. 8A illustrates a cross-section of a terminal hopper 225 along a first plane. In the perspective of FIG. 8A, gas flow 610 is directed from right to left. FIG. 8B illustrates a cross-section of the terminal hopper 225 along a second plane, which is approximately normal to the first plane. In the perspective of FIG. 8B, gas flow 610 is directed into or out of the page.

As shown in FIGS. 8A-8B, in addition, or alternatively, to the conventional baffles 715 and 720 described above, embodiments of the present filtration system 205 can further comprise various retaining members. The retaining members can include one or more upper baffles 810, one or more lower baffles 820, and one or more particulate traps 830, none of which are present in conventional systems. The baffles 810 and 820 and particulate trap 830 can be used in conjunction with conventional baffles, such as the walkway baffles 715 (not shown in FIGS. 8A-8B) and hopper baffles 720.

In some exemplary embodiments, use of the upper baffles 810, lower baffles 820, and particulate trap 830 can be restricted to the terminal hopper 225 as a final means of retaining particulates 115 and 120 in the filtration system 205. This need not be the case however. Various combinations of the upper baffles 810, lower baffles 820, and particulate trap 830 can be used in non-terminal hoppers 215 and 220 as well. Although the below description refers to use of the upper baffles 810, lower baffles 820, and particulate trap 830 in only the terminal hopper 225, these components can be used in other, non-terminal hoppers 215 and 220 as well. Arrangements of upper baffles 810, lower baffles 820, and particulate traps 830 can vary depending aspects of the filtration system 205, preference of users of the filtration system 205, or various other reasons.

The upper and lower baffles 810 and 820 can reduce the amount of media, such as particulates 115 and 120 flying within the hopper 225. As their names suggest, upper baffles 810 can be located proximate a top portion of the hopper 225, while lower baffles 820 can be located below the upper baffles 810 in the hopper 225.

As illustrated in FIG. 8A, each hopper can comprise an upstream portion 850 and a downstream portion 860, which can be defined by the hopper baffle 720. The upper baffles 810 can be provided in the hopper 225 in various configurations relative to these portions 850 and 860 of the hopper 225. For example and not limitation, one upper baffle 810 can be provided on each side 850 and 860 of the hopper 225, connected to the upstream and downstream walls of the hopper 225. Alternatively, as shown in FIGS. 8A-8B, a pair of upper baffles 810 can be provided on each side 850 and 860 of the hopper 225. Each pair of upper baffles 810 can include an upper baffle 810 connected to a wall of the hopper 225 and an opposing upper baffle 810 connected to a hopper baffle 720. Further alternatively, a single upper baffle 810 can be placed on the downstream wall 870 of each hopper 215, 220, and 225, or just the downstream wall 870 of the terminal hopper 225. Regardless of placement, each upper baffle 810 can extend downwardly and inwardly into the hopper 225.

The lower baffles 820 are positioned deeper into the hopper 225 than are the upper baffle 810. In some exemplary embodiments of the filtration system 205, the lower baffles can be provided in both the upstream and downstream and sides 850 and 860 of the hopper 225, as shown in FIGS. 8A-8B. Alternatively, however, the lower baffles 820 can be provided on only upstream portion 850 or only the downstream portion 860 of the hopper 225.

In an exemplary embodiment, lower baffles 820 are provided in generally symmetrical pairs. Pairs of lower baffles 820 can be positioned on the hopper walls that are not occupied by upper baffles 810, and can extend downwardly and inwardly into the hopper 225. In other words, as illustrated in FIGS. 8A-8B, the lower baffles 820 can extend in directions normal to the directions in which the upper baffles 810 extend.

The upper and lower baffles 810 and 820 can be extending members, or restraining members, in communication with the hopper 225. Because they extend downwardly and inwardly into the hopper 225, the upper and lower baffles 810 and 820 can counteract the effect of some of the upwardly moving particulates 115 and 120. Consequently, the baffles 810 and 820 can counteract the effect of upwardly moving organic particulate 120.

The upper and lower baffles 810 and 820 can be connected to the hopper 225 in many ways. For example and not limitation, the baffles 810 and 820 can be welded to the hopper 225 or, alternatively, can be pivotably connected to the hopper 225.

Figure 9:
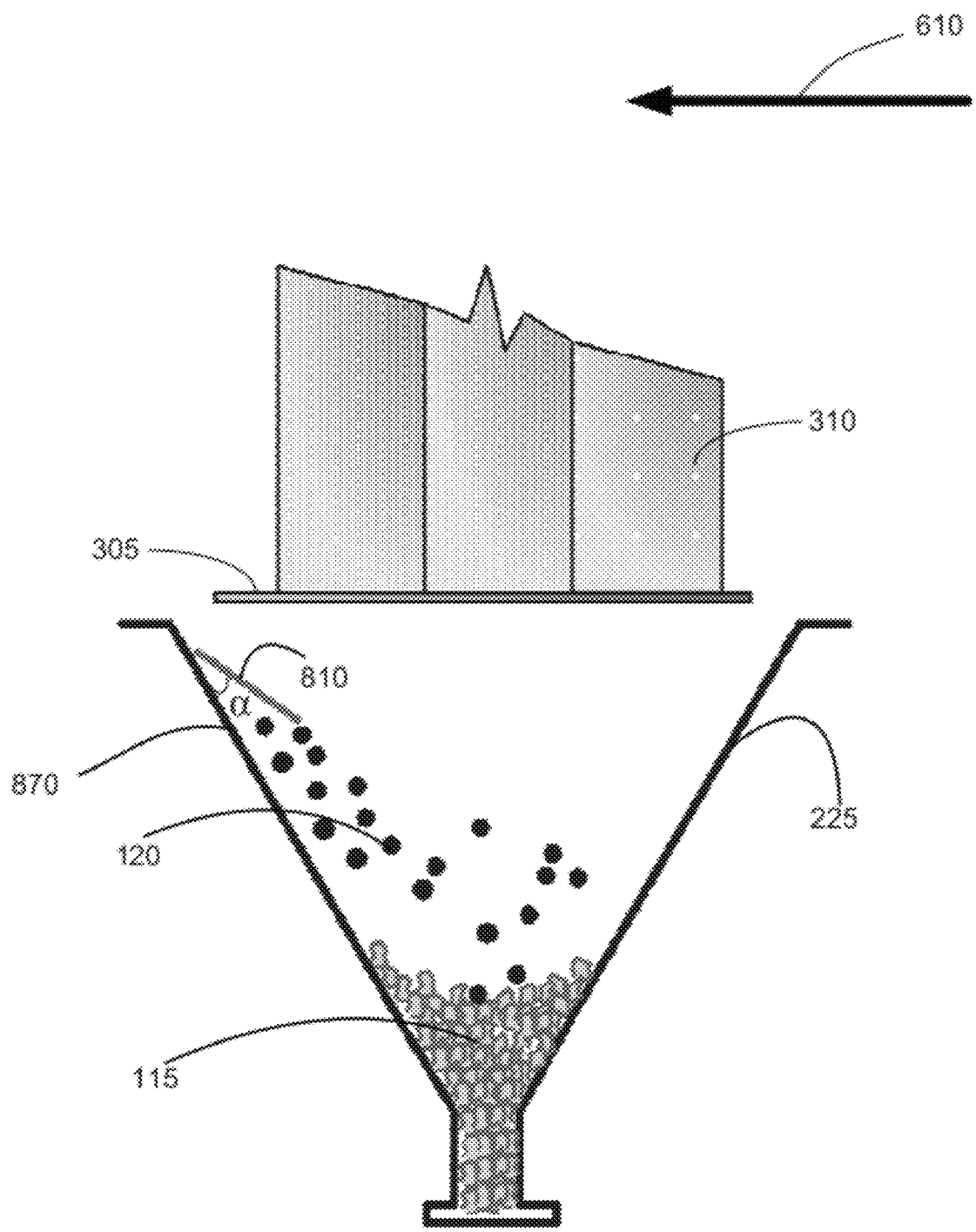
FIG. 9 illustrates a side view of the collection hopper having an upper baffle, according to an exemplary embodiment of the present invention.

Unlike the walkway baffles 715 and hopper baffles 720, the upper and lower baffles 810 and 820 direct particulate flow, and not gas flow. The baffles 810 and 820 are appropriately positioned to trap an amount of the re-entrained organic particulate 120 in the collection hopper 225. The relatively lightweight carbon making up organic particulate 120 that is re-entrained in the displaced gas comes into contact with the baffles 810 and 820 and is effectively trapped in the collection hopper 225. Thus, the baffles 810 and 820 prevent the escape of at least a portion of the re-entrained organic particulate 120 from the collection hopper 225. As shown in FIG. 9, the inorganic particulate 115 collects at the bottom of the collection hopper 225 and typically is not re-entrained into the displaced gas of the collection hopper 225.

As mentioned above, and as illustrated in FIG. 8A, the collection hopper 225 can also contain a hopper baffle 720. The hopper baffle 720 is conventionally provided in a majority of collection hoppers to prevent the flowing gas in the filtration system 205 from removing the dust cake matter from the collection hopper 225. Typically, the hopper baffle 720 is used to decrease the velocity of the gas flowing through the collection hopper 225. Without the hopper baffle 720, the flowing gas of the filtration system 205 can re-entrain the particles gathered in the collection hopper 225 and defeat the effectiveness of the filtration system 205. Therefore, some exemplary embodiments of the filtration system 205 use hopper baffles 720 in addition to upper and lower baffles 810 and 820. Additionally, other traditional elements, such as walkway baffles 715 can also be provided in or near the hopper 225.

Figure 10:
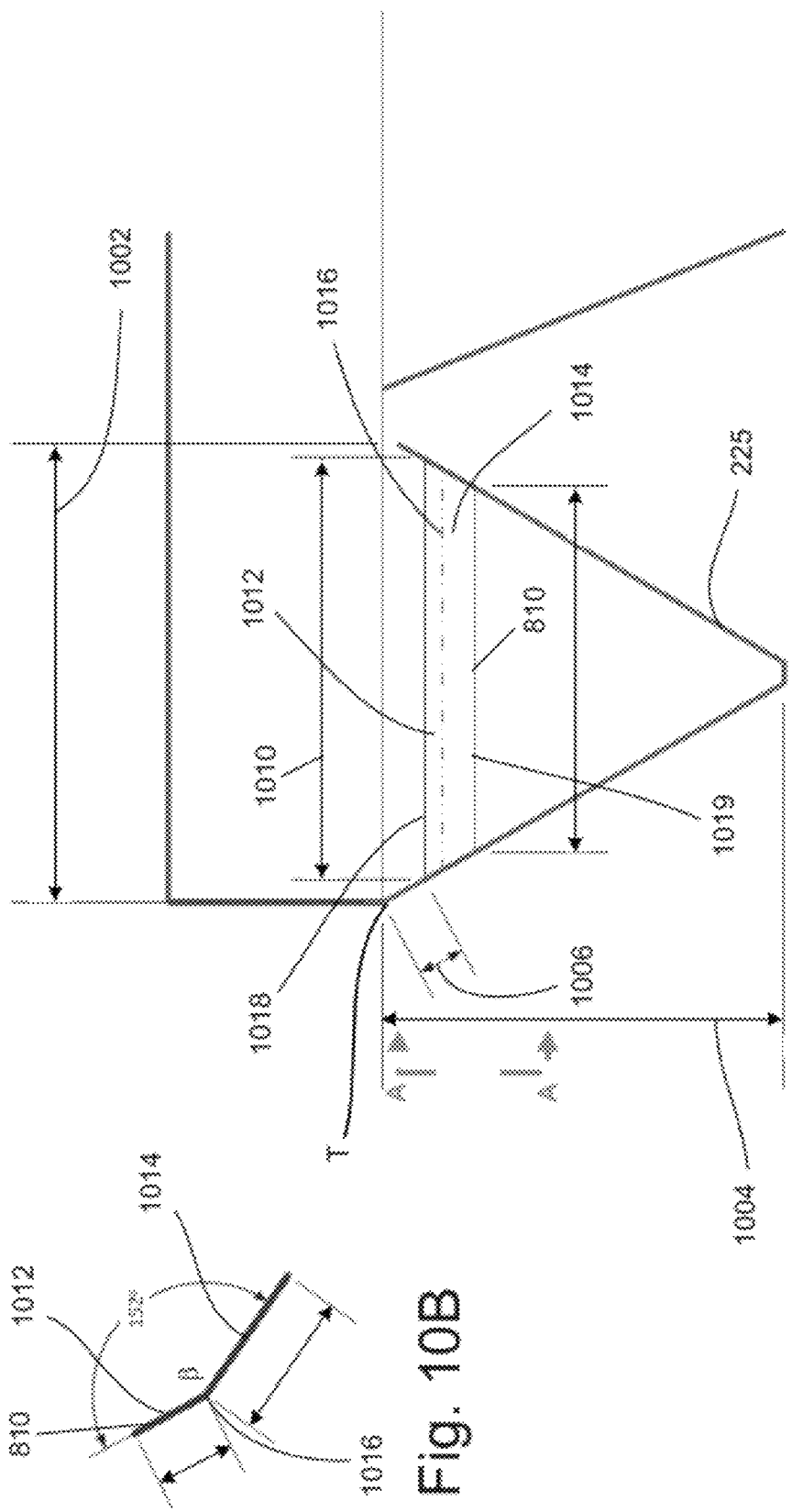
FIG. 10A illustrates a lateral view of the collection hopper, in accordance with an exemplary embodiment of the present invention.
FIG. 10B illustrates a cross-sectional view across cross-line A-A of FIG. 10A of a particulate baffle.

FIG. 9 illustrates an exemplary use of a baffle 810 and 820, particularly an upper baffle 810, in a hopper 225 of the filtration system 205. Although only an upper baffle 810 is discussed in reference to FIGS. 9-11, the lower baffles 820 are constructed and behave in the same, or similar, manner as the upper baffles. Therefore, discussions regarding the upper baffle 810 in FIG. 9 can also apply to the lower baffles 820.

As illustrated in FIG. 9, some the organic particulate 120 cannot escape the collection hopper 225 because the upper baffle 810 obstructs the opening of the hopper 225, thereby preventing some re-entrained organic particulate 120 from escaping the hopper 225. Notably, the flow of displaced gas can create an eddy current, which then captures the organic particulate 120 in the wake of the eddy current. More specifically, the centrifugal force of the organic particulate 120 can cause the organic particulate 120 to be trapped by the upper baffle 810 when the displaced gas flows rapidly around the upper baffle 810. Once the organic particulate 120 has been removed from the displaced gas exiting the collection hopper 225, the particulate 120 descends back down into the collection hopper 225. From there, the organic particulate 120 can be removed with the other particulate contained in the collection hopper 225 and thereby prevented from re-entering the filtration system 205 and potentially contributing to the emissions of the coal power plant combustion system.

The upper baffle 810 provides an efficient and effective method for filtering organic particulate 120 from the emissions of the combustion system. Not only is the upper baffle 810 fairly inexpensive to install, it is also passive and thus does not import significant operational costs to implement and maintain.

Because the collection hopper 225 is at ground potential, the upper baffle 810 can be positioned sufficiently far away from the collection plate 305 to prevent an electrical short circuit. In an embodiment in which the collection plate 305 is positively charged, an electrical arc could form between the upper baffle 810 and the collection plate 305 if they are not positioned far enough away from each other.

The upper baffle 810 can be of varying lengths depending upon the parameters of the collection hopper 225 in which it is implemented. Thus, the dimensions of the upper baffle 810 can be adjusted to correspond to the dimensions of the collection hopper 225. It is desired for a portion of the upper baffle 810 to extend far enough into the open body of the collection hopper 225 so as to sufficiently interrupt the flow of gas to inhibit organic particulate 120 release from the hopper, while not fully impeding gas flow. In some embodiments the length 1010 of the upper baffle 810 can range from approximately one to four feet. Exemplarily, the upper baffle 810 can be approximately 18 inches long.

As shown in FIG. 9, an upper baffle 810 can be positioned at a downward angle. More specifically, the upper baffle 810 can create an acute angle $\alpha$ between the upper baffle 810 and portions beneath the upper baffle 810 on the wall 870 of the collection hopper 225. In addition to the length 1010 of the upper baffle 810, the angle $\alpha$ of the upper baffle 810 can vary depending upon the parameters of the collection hopper 225 in which it is implemented. The acute angle $\alpha$ of the upper baffle 810 can be selected to enable the upper baffle 810 to most efficiently trap the organic particulate 120. In some embodiments, it is desired for the upper baffle 810 to be positioned with a sufficient downward angle to ensure that the descent of the dust cake 310 into the collection hopper 225 is not impeded, while at the same time, still enabling the interruption in the flow of gas exiting the collection hopper. In other words, the upper baffle 810 can be positioned such that dust cake does not collect upon the upper surface of the upper baffle 810. In some exemplary embodiments of the filtration system 205, the angle $\alpha$ can be between approximately 20 and 60 degrees and is preferably approximately 40 degrees with respect to the wall 870.

FIG. 10A illustrates a lateral view of the collection hopper 225, in accordance with an exemplary embodiment of the present invention. In the perspective of FIG. 10A, gas flow 610 is directed into or out of the page. For example and not limitation, at its upper opening, the hopper 225 can be approximately 14 feet 6⅜ inches wide 1002, and the hopper 225 can be approximately 12 feet 3 inches tall 1004. In a hopper 225 of these dimensions, the upper baffle 810 can be removed from the top T of the hopper 225 by a distance 1006 of approximately 18 inches. The upper baffle 810 can comprise an extension with a first section 1012 and a second section 1014, which can be in communication with each other. The sections 1012 and 1014 can be distinct parts connected together at a joint 1016, or alternatively, they can comprise a single piece bent at the joint 1016. In FIG. 10A, the dashed line represents the joint 1016 in the upper baffle 810. The first section 1012 of the upper baffle 810 can extend along an inner surface, such as the side wall 870, of the hopper 225. Optionally, the first section 1012 can be welded along this side wall 870 of the hopper 225, or it can be pivotably connected to the side wall 870. The second section 1014 can extend or protrude into the hopper 225.

FIG. 10B illustrates a cross-sectional view across crossline A-A of FIG. 10A of the upper baffle 810. A first section 1012 of the upper baffle 810, adjacent to the side wall 870 of the hopper 225, can be approximately 6 inches long in an exemplary embodiment. The second section 1014 of the upper baffle 810 can be approximately 18 inches long, and can be removed from the side wall 870 of the hopper 225 by an acute angle. The joint 1016 can comprise an obtuse angle between the first 1012 and second 1014 sections, which angle β, at these dimensions, can be between approximately 120 degrees and 160 degrees. In one example, the angle β between the two sections 1012 and 1014 can be approximately 152 degrees.

The first section 1012 can extend along the hopper wall 870, and the second section 1014 can extend into the interior of the hopper 225. In that case, the angle between the hopper wall 870 and the second section 1014 of the extension can be approximately supplementary to the angle between the two sections 1012 and 1014. These specific angles, however, are not required.

Referring back to FIG. 10A, in an exemplary embodiment, the upper baffle 810 can be approximately 13 feet 4 11/16 inches wide at its upper edge 1018, which upper edge is attached to the hopper side. The baffle 810 can be approximately 11 feet 7 5/16 inches wide on its lower edge 1019.

With these specifications, the upper baffle 810 can block a significant portion of organic particulate 120 from escaping the hopper 225 and, therefore, from escaping the filtration system 205 as emissions. The provided dimensions are illustrative, and many dimensions in these proportions, or in other proportions that will serve the same or similar functions, may be used. When the dust cake drops into the hopper 225 and organic particulate 120 is forced upward, the upper baffle 810 can block much of this particulate 120 from escaping the hopper 225. As a result, organic particulate 120 can be more successfully filtered from the system and the emission of such trapped organic particulate 120 is avoided.

The upper baffle 810 can be composed of steel or another alloy. In an exemplary embodiment, the upper baffle 810 is made of carbon steel. Additionally, the upper baffle 810 can be of varying thicknesses. The upper baffle 810 is rigid enough to withstand the heavy pressures applied in the collection hopper 225 by the incoming dust cake and the escaping displaced gas. For example and not limitation, the upper baffle 810 can range in thickness from approximately 1/4 inch to 1 inch. As illustrated in FIGS. 10A-10B, the upper baffle 810 can be approximately 1/8 inch thick. The upper baffle 810 can be installed and implemented in the manner shown in FIGS. 10A-10B or in a variety of other manners or dimensions.

Figure 11:
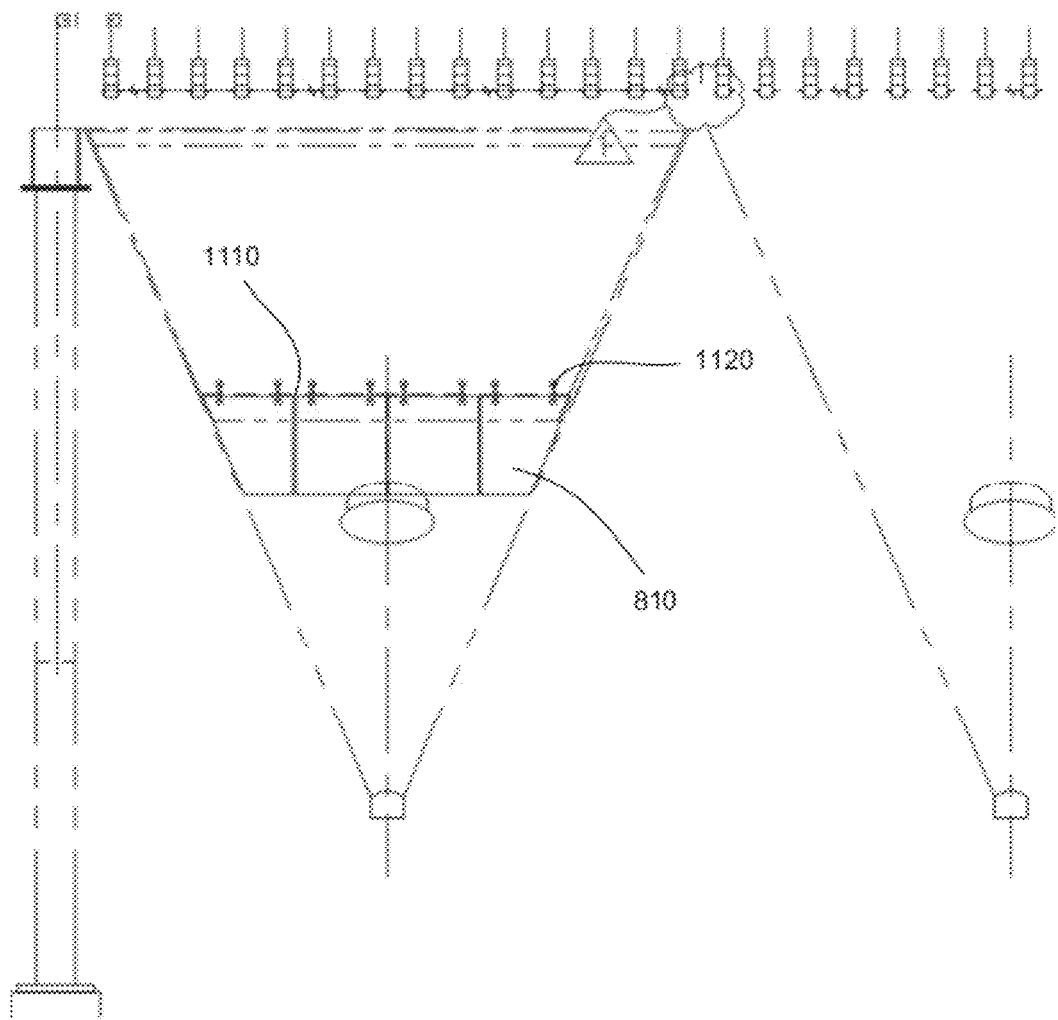
FIG. 11 illustrates a cross sectional view of a row of upper baffles, according to an exemplary embodiment of the present invention.

FIG. 11 illustrates another embodiment of the upper baffle 810 used in conjunction with the hopper 225. FIG. 11 illustrates the upper baffles 810 by means of a lateral cross-sectional view of the filtration system 205. In the perspective of FIG. 11, gas flow (not shown) is directed into the page. The embodiment depicted in FIG. 11 is an illustration of a site specific installation of the upper baffle 810. The dimensions provided for the upper baffle 810 and the surrounding environment are exemplary only and can be altered without departing from the scope of the invention. The upper baffles 810 depicted in FIG. 11 are dynamic swing baffles. These upper baffles 810 can be approximately 29 inches long. In an alternative embodiment, the swing baffles 715 can be longer or shorter in dimension.

An extending member 1110, or extending line or wire, can extend from one side of the filtration system 205 to the other. One or more upper baffles 810 can extend downwardly from the extending member 1110. As shown, the upper baffles 810 can be dynamic. They can be attached to the extending member 1110 by means of chain links 1120 or by some other means that allows the upper baffles 810 to swing or pivot relative to the extending member 1110. When particulates 115 and 120 are forced upward, the upper baffles 810 can swing, thereby increasing the angle between the upper baffles 810 and the side wall 870 of the hopper 225. When the upper baffles 810 swing upward, they can trap particulates 115 and 120 in the hopper 225.

Although the lower baffles 820 are not described in detail herein, the lower baffles 820 can have the same or similar properties, and can serve the same or similar functions, as the upper baffles 810.

In addition to the various baffles 715, 720, 810, and 820 of the filtration system 205, the filtration system can further comprise one or more particulate traps 830. In an exemplary embodiment, a trap 830 is provided in only the terminal hopper 225, but this need not be case. A particulate trap 830 can be provided in all, or a subset, of the hoppers in the filtration system 205.

Figure 12:
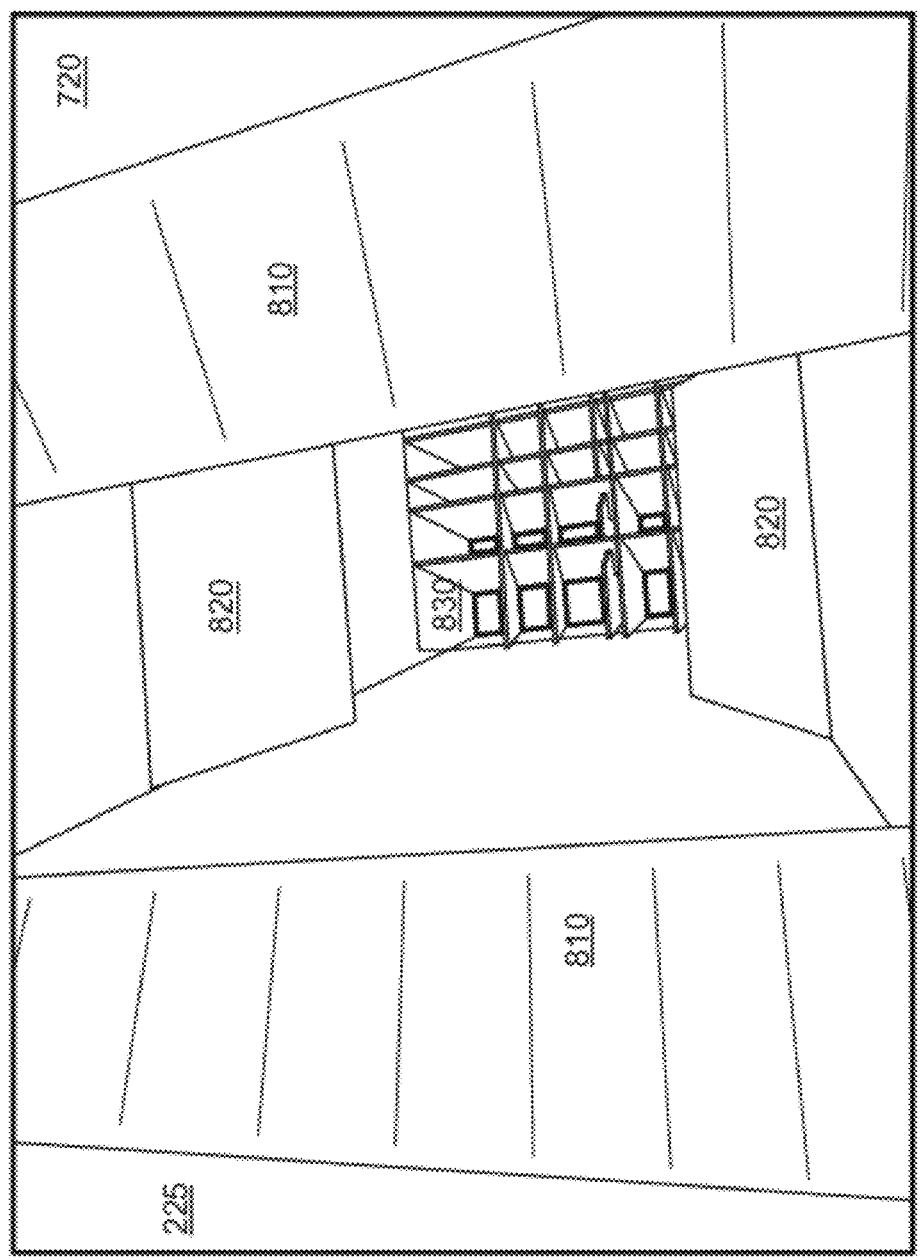
FIG. 12 illustrates a downward view of a particulate trap seated inside the collection hopper, according to an exemplary embodiment of the present invention.
Figure 13:
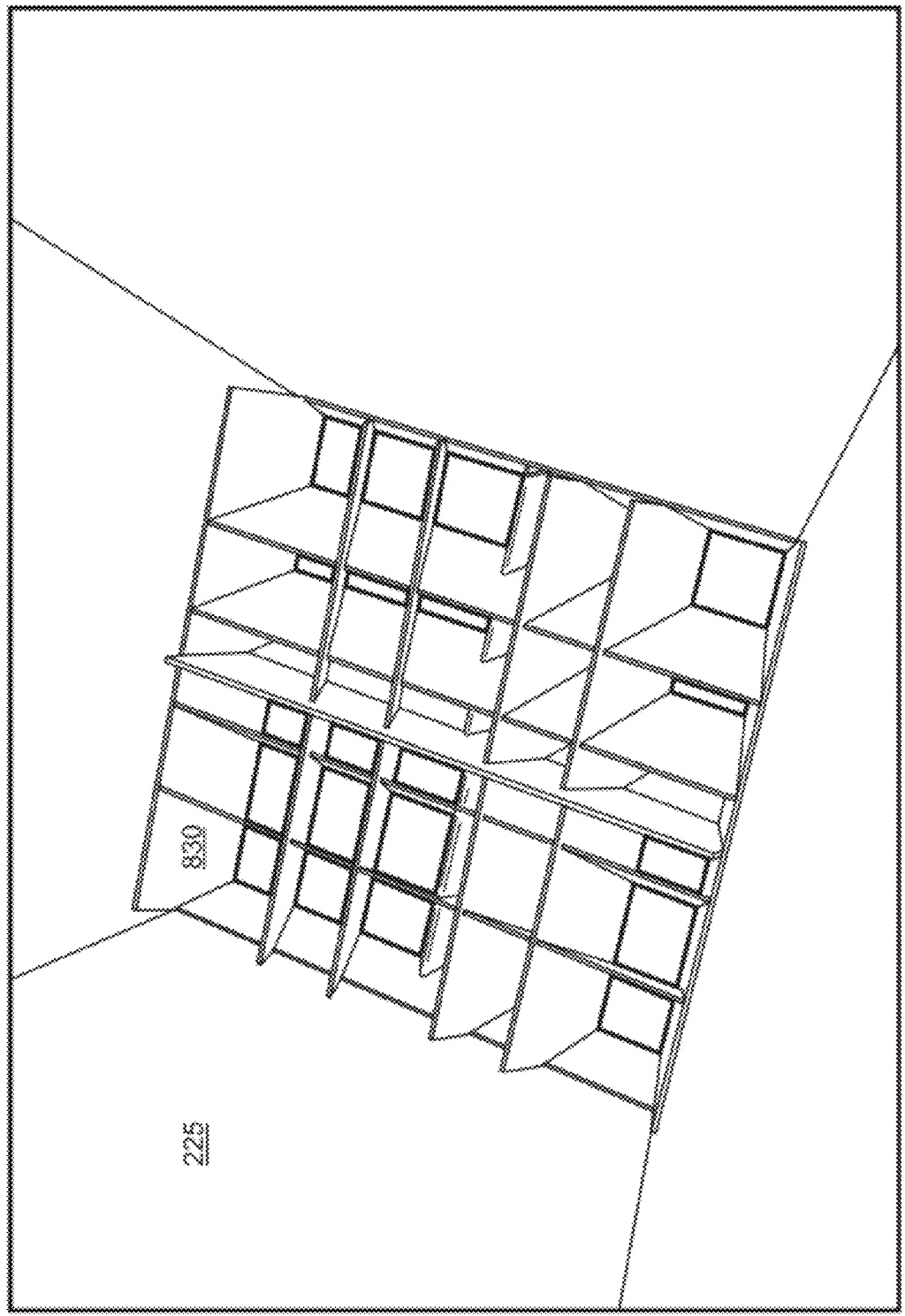
FIG. 13 illustrates the particulate trap positioned in the collection hopper, according to an exemplary embodiment of the present invention.
Figure 14:
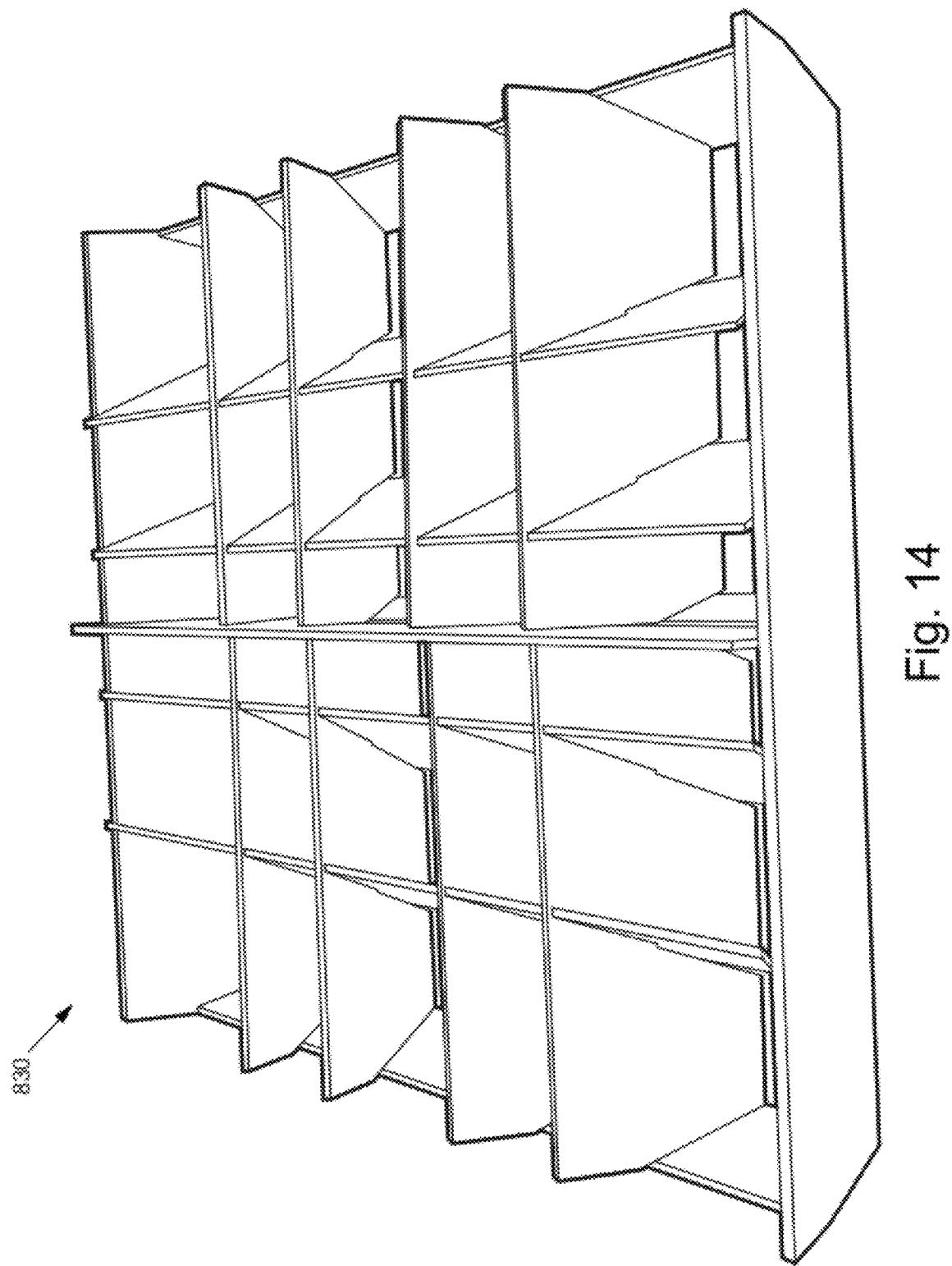
FIG. 14 illustrates a top perspective view of the particulate trap, according to an exemplary embodiment of the present invention.

FIGS. 12-15 illustrate various views of an embodiment of the particulate trap 830. FIG. 12 illustrates a downward view of a hopper 225 containing the particulate trap 830, along with upper and lower baffles 810 and 820. As shown in FIG. 12, the trap 830 can be located deeper in the hopper 225 than the lower baffles 820, which are located deeper than the upper baffles 810. FIG. 13 illustrates an unobstructed downward view of the particulate trap 830 in the hopper 225. The particulate trap can be positioned below, and proximate the bottom of, a hopper baffle 720 extending into the hopper 225. Additional views of the trap 830 are provided in FIGS. 14-15. Specifically, FIG. 14 illustrates a perspective view of the top of the particulate trap 830, and FIG. 14 illustrates a perspective view of the bottom of the particulate trap 830.

Figure 15:
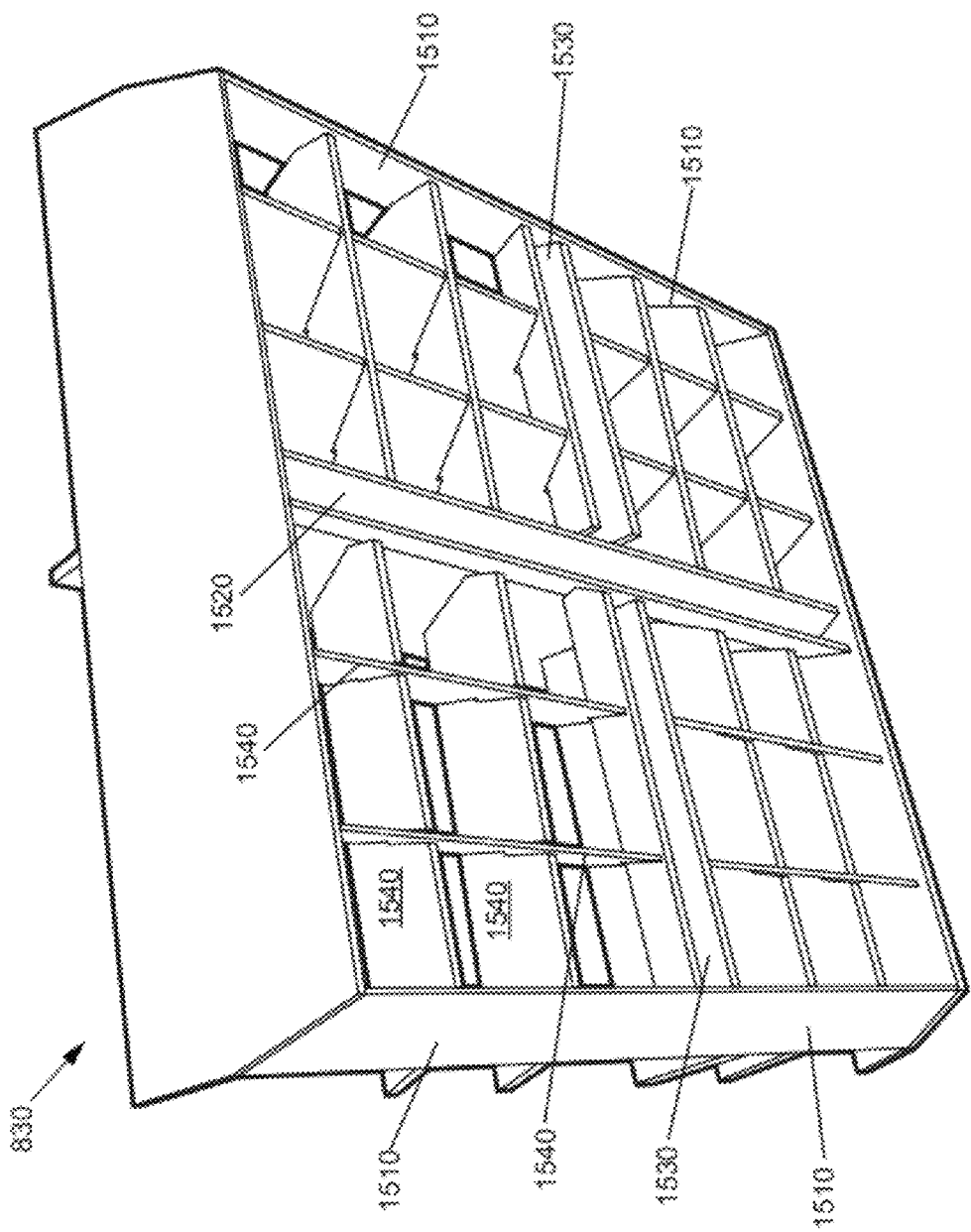
FIG. 15 illustrates a bottom perspective view of the particulate trap, according to an exemplary embodiment of the present invention.

Like the upper and lower baffles 810 and 820, the particulate trap 830 can obstruct the flow of particulates, particularly organic particulates 120, out of the hopper 225. The particulate trap 830 can be shaped to fit securely into the hopper 225. For example, if, as shown, the hopper 225 has four slanted internal faces, the trap 830 can have four corresponding slanted sides. Alternatively, if the hopper 225 is conical, the particulate trap 830 can have a circular shape. The trap 830 can be divided into a plurality of sections, which can have the same general shape as the trap 830 as a whole. For example, as shown in FIG. 15, the trap 830 can be divided into the four sections 1510. The sections 1510 can be defined by a center divider 1520 and two side dividers 1530 perpendicular to the center divider.

Figure 16:
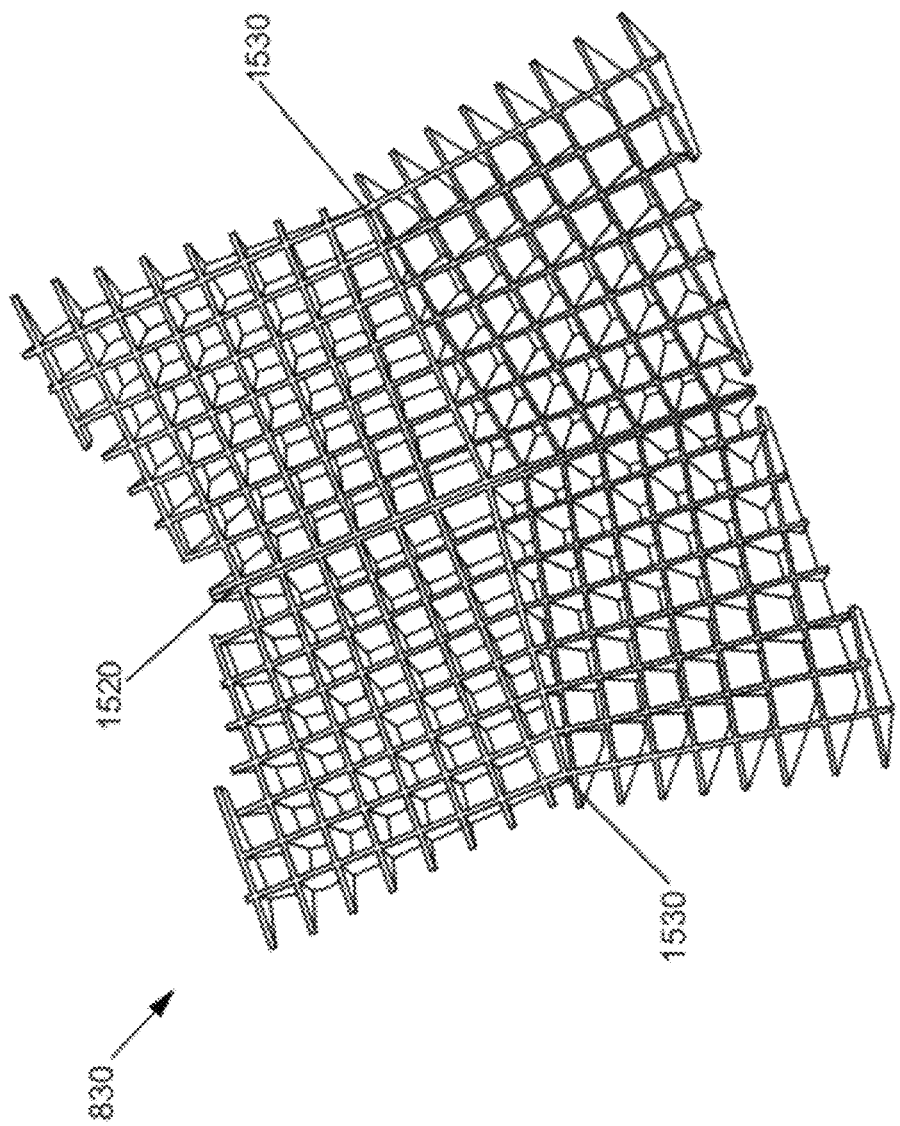
FIG. 16 illustrates an alternate embodiment of the particulate trap, according to an exemplary embodiment of the present invention.

FIG. 16 illustrates an alternate embodiment of the particulate trap 830. As shown in FIG. 16, the center divider 1520 and the side dividers 1530 can be configured to angle the sections 1510 of the particulate trap 830 upward and inward. Alternatively, although not shown, only the center divider 1520 can be configured to angle the sections 1510 of the particulate trap 830 upward and inward, thereby creating a V-shape.

Referring back to FIG. 15, each section 1510 of the particulate trap 830 can comprise one or more slats 1540, or sets of slats 1540, extending across the section 1510. The slats 1540 need not be completely contained within individual sections 1510 of the trap 830, and in some embodiments, one, some, or all of the slats can extend substantially across the particulate trap 830 as a whole. Furthermore, in some embodiments, the particulate trap 830 need not be divided into sections at all.

Figure 17:
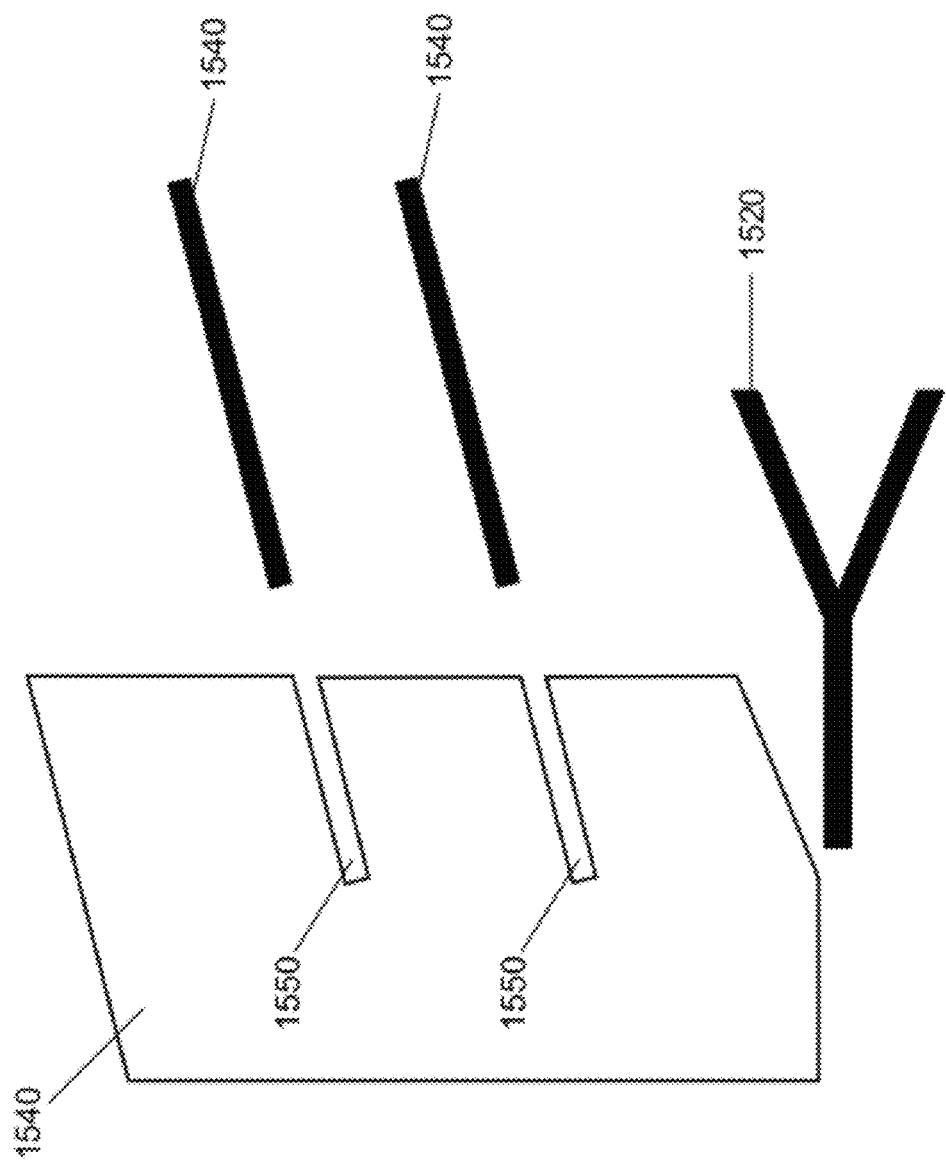
FIG. 17 illustrates a diagram of interconnecting slats of the particulate trap, according to an exemplary embodiment of the present invention.

For example, as shown, each section 1510 of the particulate trap 830 can comprise two sets of parallel slats 1540, where the sets extend in perpendicular directions across the section 1510. Each pair of intersecting, perpendicularly-extending slats 1540 can be secured to each other by notches 1550, or slits, defined by the slats 1540. FIG. 17 illustrates a diagram of interconnecting slats 1540. In FIG. 17, a side of one slat 1540 is visible, along with the top edges of two interconnecting slats 1540. As shown in FIG. 17, each notch 1550 of a slat 1540 can receive a portion of an intersection slat 1540. Referring back to FIG. 15, as shown, each set of slats extending in a single direction can be oriented at generally the same angle with respect to the trap 830 as a whole. Each section 1510, however, can have slats 1540 arranged at orientations that differ from slats in other sections of the trap 830.

Because the particulate trap 830 can comprise a plurality of slats in various positions and orientations, the trap 830 can enable trapping of particulates 115 and 120 moving in various directions toward the opening of the hopper 225. Accordingly, a combination of the particulate trap 830, the upper and lower baffles 810 and 820, and the conventional baffles 720 and 715 can be more effective in filtering organic particulates than a conventional filtration system.

While the invention has been disclosed in various illustrative embodiments, many modifications, additions, and deletions can be made therein without departing from the spirit and scope of the invention and its equivalents, as set forth in claims to be filed in a later, non-provisional application.

What is claimed is:

1. A collection assembly in a filtration system, the collection assembly comprising:
   a container for containing media, the container defining an interior and comprising at least one interior wall; and
   a particulate trap positioned within the container in communication with the interior wall, the particulate trap comprising a plurality of retaining members extending longitudinally in two or more directions, the plurality of retaining members including a first retaining member extending longitudinally away from the interior wall and into the interior of the container and a second retaining member in contact with the first retaining member, the particulate trap being configured to obstruct an upward flow of particulates in the container.

2. The collection assembly of claim 1, the plurality of retaining members of the particulate trap comprising a first set of retaining members extending from the interior wall into the container in a longitudinal direction and substantially parallel to one another, and a second set of retaining members substantially perpendicular to the first set of retaining members.

3. The collection assembly of claim 2, the first set of retaining members having two or more orientations.

4. The collection assembly of claim 1, the plurality of retaining members being interconnected.

5. The collection assembly of claim 1, the first and second retaining members being perpendicular to each other along their lengths.

6. The collection assembly of claim 1, the plurality of retaining members of the particulate trap further comprising a third retaining member substantially parallel to the first retaining member in a longitudinal direction, and positioned at a different orientation than the first retaining member.

7. The collection assembly of claim 1, the interior wall comprising a tapering section, wherein the container is wider at a top of the tapering section than at the bottom of the tapering section, and the particulate trap being attached to the tapering section of the interior wall.

8. A filtration system comprising:
   a plurality of particulates entrained in a flow of a medium;
   a collection mechanism for collecting at least some of the particulates;
   a first container adapted to contain the particulates after collection, the first container having an inner surface; and
   a first particulate trap positioned within the first container in communication with the inner surface, the first particulate trap comprising a first set of retaining members extending longitudinally from the inner surface into the interior of the first container, the first particulate trap being configured to obstruct an upward flow of particulates in the container, the first set of retaining members comprising a first retaining member and a second retaining member having different orientations.

9. The filtration system of claim 8, the first set of retaining members extending substantially across the first container.

10. The filtration system of claim 8, the first particulate trap further comprising a second set of retaining members intersecting the first set of retaining members.

11. The filtration system of claim 8, the first particulate trap further comprising a second set of retaining members interconnected with and substantially perpendicular to the first set of retaining members.

12. The filtration system of claim 8, further comprising a second container having a second particulate trap positioned in its interior.

13. A method for filtering particulates generated during a combustion process, the method comprising:
   collecting particulates into a container, the container having at least one wall; and
   reducing the upward escape of particles from the container with a particulate trap container in communication with the wall of the container, the particulate trap comprising a first set of retaining members extending longitudinally from the wall into the interior of the container, the first set of retaining members comprising a first retaining member and second retaining member substantially parallel to the first retaining member, the first retaining member and the second retaining member having different orientations.

14. The method of claim 13, at least one of the first set of retaining members extending across the interior of the container.

15. The method of claim 13, the particulate trap further comprising a second set of retaining members extending into the interior of the container substantially perpendicularly to the first set of retaining members.

16. The method of claim 15, at least one of the second set of retaining members intersecting at least one of the first set of retaining members.

17. A filtration system comprising:
   a plurality of particulates entrained in a flow of a medium;
   a collection mechanism for collecting at least some of the particulates;
   a first container adapted to contain the particulates after collection, the first container having an inner surface; and
   a first particulate trap positioned within the first container in communication with the inner surface, the first particulate trap comprising a first set of retaining members extending longitudinally from the inner surface into the interior of the first container and a second set of retaining members intersecting the first set of retaining members, the first particulate trap being configured to obstruct an upward flow of particulates in the container.

18. The filtration system of claim 17, the first set of retaining members extending substantially across the first container.

19. The filtration system of claim 17, the first set of retaining members comprising a first retaining member and a second retaining member having different orientations.

20. The filtration system of claim 17, wherein the second set of retaining members are interconnected with and substantially perpendicular to the first set of retaining members.

21. A filtration system comprising:
a plurality of particulates entrained in a flow of a medium;
a collection mechanism for collecting at least some of the particulates;
a first container adapted to contain the particulates after collection, the first container having an inner surface; and
a first particulate trap positioned within the first container in communication with the inner surface, the first particulate trap comprising a first set of retaining members extending longitudinally from the inner surface into the interior of the first container and a second set of retaining members interconnected with and substantially perpendicular to the first set of retaining members, the first particulate trap being configured to obstruct an upward flow of particulates in the container.

22. The filtration system of claim 21, the first set of retaining members extending substantially across the first container.

23. The filtration system of claim 21, the first set of retaining members comprising a first retaining member and a second retaining member having different orientations.

* * * * *